(12) United States Patent
Bickham et al.

(10) Patent No.: US 6,671,445 B2
(45) Date of Patent: Dec. 30, 2003

(54) DISPERSION SLOPE COMPENSATING OPTICAL FIBER

(75) Inventors: Scott R. Bickham, Corning, NY (US); Michael B. Cain, Corning, NY (US); Shiva Kumar, Painted Post, NY (US); Snigdharaj K. Mishra, Wilmington, NC (US); V. Srikant, Ithaca, NY (US); Jeffery S. Stone, Addison, NY (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 09/870,432

(22) Filed: May 30, 2001

(65) Prior Publication Data

US 2002/0028051 A1 Mar. 7, 2002

Related U.S. Application Data

(60) Provisional application No. 60/208,342, filed on May 31, 2000, and provisional application No. 60/217,967, filed on Jul. 13, 2000.

(51) Int. Cl.[7] .................................................. G02B 6/02
(52) U.S. Cl. ........................................ 385/127; 359/161
(58) Field of Search ................................. 385/127, 128, 385/129, 130, 131, 123, 147; 359/161

(56) References Cited

U.S. PATENT DOCUMENTS

| | | | | |
|---|---|---|---|---|
| 5,361,319 | A | | 11/1994 | Antos et al. ................. 385/123 |
| 5,448,674 | A | * | 9/1995 | Vengsarkar et al. ......... 385/123 |
| 5,838,867 | A | * | 11/1998 | Onishi et al. ................ 385/123 |
| 5,887,105 | A | | 3/1999 | Bhagavatula et al. ....... 385/123 |
| 5,999,679 | A | | 12/1999 | Antos et al. ................. 385/127 |
| 6,243,522 | B1 | * | 6/2001 | Allan et al. ................. 385/123 |
| 6,339,665 | B1 | * | 1/2002 | Danziger .................... 359/161 |
| 6,421,490 | B1 | | 7/2002 | Liu ............................. 385/127 |
| 6,430,347 | B1 | | 8/2002 | Cain et al. .................. 385/123 |
| 2000/0048439 | | | 4/2002 | Tsukitani et al. ........... 385/123 |

FOREIGN PATENT DOCUMENTS

| | | | |
|---|---|---|---|
| CA | 2232101 | 3/1998 | .......... G02B/6/10 |
| GB | 1 043 609 | 10/2000 | .......... G02B/6/16 |
| JP | WO 00/25158 | 5/2000 | .......... G02B/6/16 |
| WO | WO 98/04941 | 2/1998 | .......... G02B/6/22 |
| WO | WO 01/73486 | 10/2001 | .......... G02B/6/00 |

OTHER PUBLICATIONS

U. S. Patent Application Ser. No. 60/254,909, Dec. 12, 2000, Berkey et al.
U. S. Patent Application Ser. No. 60/276,350, Mar. 16, 2001, Berkey et al.
Berkey et al., "Negative Slope Dispersion Compensating Fibers", Conference on Optical Fiber Communications, Feb. 1997, pp. 235–237.
Semenov et al., "Broadband Dispersion–Compensating Fiber for High–Bit–Rate Transmission Network Use", Applied Optics, vol. 34, No. 24, Aug. 20, 1995, pp. 5331–5337.

* cited by examiner

*Primary Examiner*—Akm E. Ullah
(74) *Attorney, Agent, or Firm*—Randall S. Wayland; William J. Chevenak

(57) ABSTRACT

Disclosed are refractive index profiles for total dispersion compensating optical waveguide fibers for use in high data rate, long length telecommunications systems. The optical waveguide fibers in accord with the invention provide substantially equal compensation of total dispersion over a range of wavelengths, thus facilitating wavelength division multiplexed systems. Also disclosed are spans of optical waveguide fiber that include a length of transmission fiber together with a length of the compensating fiber. The spans are joined end to end in series arrangement to form the optical waveguide fiber part of a telecommunication system.

51 Claims, 12 Drawing Sheets

DISPERSION SLOPE COMPENSATING OPTICAL FIBER

This application claims the benefit of and priority to U.S. Provisional Patent Application No. 60/208,342, filed May 31, 2000 and U.S. Provisional Patent Application No. 60/217,967 filed Jul. 13, 2000.

BACKGROUND OF THE INVENTION

1. Field of the Invention

The present invention relates generally to an optical waveguide fiber designed to compensate total dispersion, and particularly to an optical waveguide fiber designed to compensate total dispersion substantially equally over a range of wavelengths.

2. Technical Background

Dispersion compensation techniques in telecommunications systems or links have been used successfully. A technique useful in links already installed is one in which total dispersion (also called chromatic dispersion) is compensated by an appropriately designed waveguide fiber formed into a module that can be inserted into the link at an access point such as an end of the link. A drawback of this technique is that the compensation module adds loss to the system without adding useful system length. For situations in which the system loss budget has a small margin, the addition of a compensation module can cause unacceptably low signal to noise ratio.

Another dispersion compensation scheme involves the use of both positive and negative dispersion fibers in the cables of the link. Each cable can contain both positive and negative total dispersion waveguide fibers, or the link can be formed using cables having only positive dispersion together with cables having only negative dispersion. This compensation scheme avoids the drawback associated with the compensation module but necessarily complicates the installation and maintenance of the system. That is, the dispersion sign of a particular cable or of the fibers in the cable must be identified during installation. Also, an inventory of replacement cables would be increased over that required for standard systems because dispersion sign is an additional variable that must be taken into account in maintaining an effective inventory.

More recently, an alternative dispersion compensation technique has been developed in conjunction with a particular optical waveguide fiber having a total dispersion and a total dispersion slope which effectively mirrors that of the transmission fiber. That is, the ratio of total dispersion to total dispersion slope, κ, has the same value for the transmission fiber and for the compensating fiber. This fiber type is disclosed and discussed in U.S. provisional application S.No. 60/217,967, incorporated herein by reference in its entirety.

For the telecommunications system in which mirror fiber is used, the compensation is said to be perfect in that the end to end accumulated dispersion of a span including a transmission fiber and a compensating fiber is zero across the wavelength range of operation. The result of such a configuration is that signals in the fiber traverse significant span lengths in which the total dispersion is zero or near zero.

However, in certain applications it may be desirable to use the 1:1 length ratio of transmission to dispersion compensating optical waveguide fiber, as in the case of certain mirror fiber, but still maintain a non-zero local dispersion to avoid dispersion penalties due to four wave mixing and cross phase modulation. In this case, one would need a compensating waveguide fiber that mirrored the total dispersion slope but not the total dispersion of the transmission fiber.

In addition, perhaps because of consideration of the effective area or attenuation of the compensating fiber, one may wish to use a length ratio other than 1:1, for example a ratio of 1.5:1, or 2:1, where the longer length is typically taken to be the that of the transmission fiber.

There is therefore a need for dispersion compensating optical waveguide fibers designed to meet a variety of compensation formats that derive from the variety of system performance requirements together with a desired transmission to compensating fiber length ratio.

Definitions

The following definitions are in accord with common usage in the art.

The refractive index profile is the relationship between refractive index or relative refractive index and waveguide fiber radius.

A segmented core is one that is divided into at least a first and a second waveguide fiber core portion or segment. Each portion or segment is located along a particular radial length, is substantially symmetric about the waveguide fiber centerline, and has an associated refractive index profile.

The radii of the segments of the core are defined in terms of the respective refractive indexes at respective beginning and end points of the segments.

The definitions of the radii used herein are set forth in the figures and the discussion thereof.

Total dispersion, sometimes called chromatic dispersion, of a waveguide fiber is the sum of the material dispersion, the waveguide dispersion, and the inter-modal dispersion. In the case of single mode waveguide fibers the inter-modal dispersion is zero.

The sign convention generally applied to the total dispersion is as follows.

Total dispersion is said to be positive if shorter wavelength signals travel faster than longer wavelength signals in the waveguide. Conversely, in a negative total dispersion waveguide, signals of longer wavelength travel faster.

The effective area is $$A_{eff} = 2\pi (\int E^2 r dr)^2 / (\int E^4 r dr),$$

where the integration limits are 0 to ∞, and E is the electric field associated with light propagated in the waveguide.

The relative refractive index percent, $\Delta\% = 100 \times (n_i^2 - n_c^2)/2n_i^2$, where $n_i$ is the maximum refractive index in region i, unless otherwise specified, and $n_c$ is the average refractive index of the cladding region. In those cases in which the refractive index of a segment is less than the average refractive index of the cladding region, the relative index percent is negative and is calculated at the point at which the relative index is most negative unless otherwise specified.

The term α-profile refers to a refractive index profile, expressed in terms of $\Delta(b)\%$, where b is radius, which follows the equation, $$\Delta(b)\% = \Delta(b_o)(1 - [|b - b_o|/(b_1 - b_o)]^\alpha),$$

where $b_o$ is the point at which $\Delta(b)\%$ is maximum, $b_1$ is the point at which $\Delta(b)\%$ is zero, and b is in the range $b_i \leq b \leq b_f$, where delta is defined above, $b_i$ is the initial point of the α-profile, $b_f$ is the final point of the α-profile, and α is an exponent which is a real number.

A waveguide fiber telecommunications link, or simply a link, is made up of a transmitter of light signals, a receiver of light signals, and a length of waveguide fiber having respective ends optically coupled to the transmitter and receiver to propagate light signals therebetween. The length of waveguide fiber can be made up of a plurality of shorter lengths that are spliced or connected together in end to end series arrangement. A link can include additional optical components such as optical amplifiers, optical attenuators, optical switches, optical filters, or multiplexing or demultiplexing devices. One may denote a group of inter-connected links as a telecommunications system.

The pin array bend test is used to compare relative resistance of waveguide fibers to bending. To perform this test, attenuation is measured for a waveguide fiber with essentially no induced bending loss. The waveguide fiber is then woven about the pin array and attenuation again measured. The loss induced by bending, typically expressed in units of dB, is the difference between the two attenuation measurements. The pin array is a set of ten cylindrical pins arranged in a single row and held in a fixed vertical position on a flat surface. The pin spacing is 5 mm, center to center. The pin diameter is 0.67 mm. The waveguide fiber is caused to pass on opposite sides of adjacent pins. During testing, the waveguide fiber is placed under a tension just sufficient to make the waveguide conform to a portion of the periphery of the pins. The test pertains to macro-bend resistance of the waveguide fiber.

Another bend test referenced herein is the lateral load test. In this test a prescribed length of waveguide fiber is placed between two flat plates. A #70 wire mesh is attached to one of the plates. A known length of waveguide fiber is sandwiched between the plates and a reference attenuation is measured while the plates are pressed together with a force of 30 newtons. A 70 newton force is then applied to the plates and the increase in attenuation, typically express in units of dB/m, is measured. This increase in attenuation is the lateral load attenuation of the waveguide.

A further bend test referenced herein is the mandrel wrap test. The attenuation induced by wrapping an optical waveguide fiber about a mandrel is measured. Standard test conditions include 100 turns of waveguide fiber around a 75 mm diameter mandrel and 1 turn of waveguide fiber around a 32 mm diameter mandrel. Other mandrel sizes such as 50 mm diameter or 20 mm diameter can be used. The attenuation induced by the wrapping about the mandrel is typically expressed in dB.

SUMMARY OF THE INVENTION

A first aspect of the present invention is a dispersion compensating optical waveguide fiber having, at 1550 nm, a total dispersion in the range from −12 ps/nm-km to −35 ps/nm-km, a total dispersion slope in a range from −0.04 ps/nm$^2$-km to −0.11 ps/nm$^2$-km, and a polarization mode dispersion less than 0.10 ps/km$^{1/2}$. Preferably, the polarization mode dispersion is less than 0.05 ps/km$^{1/2}$, and more preferably less than 0.01 ps/km$^{1/2}$. Attenuation at 1550 nm is less than 0.25 dB/km, preferably less than 0.23 dB/km, and more preferably less than 0.22 dB/km.

In an embodiment of this first aspect of the invention, the ratio of total dispersion to total dispersion slope, κ, has a range from 225 to 375.

A second aspect of the invention is a dispersion compensating optical waveguide fiber having a core region which includes a central segment having an outer radius $r_o$, and an annular segment surrounding the central segment having outer radius $r_1$. The dispersion compensating fiber has a total dispersion in a range from −12 ps/nm-km to −35 ps/nm-km, a total dispersion slope in a range from −0.04 ps/nm$^2$-km to −0.11 ps/nm$^2$-km. The ratio of the outer radius of the central segment, $r_o$, to the outer radius, $r_1$, of the first annular segment is defined by the expression, $0.4 < r_o/r_1 \leq 0.6$.

In an embodiment of a waveguide fiber in accord with this aspect of the invention, the attenuation and polarization mode dispersion are the same as those set forth above in the first aspect of the invention.

In a further embodiment of this second aspect of the invention, the preferred range for the ratio of the radii is defined by the expression, $0.4 < r_o/r_1 \leq 0.55$.

A third aspect of the invention is a dispersion compensating optical waveguide fiber having a core region surrounded by a clad layer, the core region including a central segment and three annular segments successively surrounding the central segment. The term surrounding means that the successive segments of the core region are in contact with their nearest neighbors. For example, the first annular segment is abutted by the central segment at its inner surface and by the second annular segment at its outer surface. Each segment is characterized by an inner and an outer radius, as defined in the drawings and the detailed description thereof, a refractive index profile, and a relative index percent. As is stated in the Definitions section, the relative index percent represents the maximum magnitude of relative index of the particular segment unless otherwise specified. The configuration of the segments provides, at a wavelength of 1550 nm, a total dispersion in a range from −12 ps/nm-km to −35 ps/nm-km, a total dispersion slope in a range from −0.04 ps/nm$^2$-km to −0.11 ps/nm$^2$-km. The third annular segment is further characterized by a width, $w_3$, and a center radius, $r_c$. The relationship among the parameters, $w_3$, $r_c$, and the outer radius of the first annular segment $r_1$ is, $r_c − w_3/2 > r_1 + 0.5\,\mu m$. In a preferred embodiment, the relationship among these parameters is, $r_c − w_3/2 > r_1 + 1.0\,\mu m$. The placement and extent of the maximum index of the third annular segment are key parameters in providing the desired properties of the optical waveguide fiber in accord with the invention.

A fourth aspect of the invention is a dispersion compensating optical waveguide fiber having a core region profile and a clad layer profile selected to provide, at a wavelength of 1550 nm, a total dispersion in a range from −12 ps/nm-km to −35 ps/nm-km, a total dispersion slope in a range from −0.04 ps/nm$^2$-km to −0.11 ps/nm$^2$-km, and, resistance to bend loss is characterized by: an induced attenuation of less than 0.05 dB at 1310 nm and less than 0.10 dB at 1550 nm when the fiber is wrapped 100 turns about a 50 mm diameter mandrel; an induced attenuation of less that 0.50 dB at 1550 nm when the fiber is wrapped 1 turn about a 32 mm diameter mandrel; an induced attenuation of less than 0.50 dB at 1625 nm when the fiber is wrapped 100 turns about a 75 mm mandrel; an induced attenuation of less than 1.0 dB/m under lateral load testing; and, an induced attenuation of less than 8 dB when the fiber is configured in a pin array bend test.

In embodiments of the optical waveguide fiber in accord with this aspect of the invention, induced attenuation in the pin array bend test is less than 7 dB and preferably less than 4 dB. The induced attenuation under lateral load bending is preferably less than 0.75 dB/m.

A fifth aspect of the invention is a dispersion compensating optical waveguide fiber having, at a wavelength of 1550 nm, a total dispersion in a range from −12 ps/nm-km to −35 ps/nm-km, a total dispersion slope in a range from −0.04 ps/nm$^2$-km to −0.11 ps/nm$^2$-km, and an effective area at 1550 nm not less than 23 $\mu$m$^2$. In a preferred embodiment of this aspect of the invention, the effective area is not less than 25 $\mu$m$^2$. More preferably, the effective area is not less than a value in the range from 28 $\mu$m$^2$ to 30 $\mu$m$^2$.

In an embodiment in accord with any one of the five aspects of the invention, the core region includes a central segment having a relative refractive index percent, $\Delta_o\%$, in the range from 0.8% to 1.7%, an inner radius zero and an outer radius, $r_o$, in the range from 2.4 $\mu$m to 3.2 $\mu$m, a first annular segment, surrounding the central segment, having a relative refractive index percent, $\Delta_1\%$, in the range from −0.28% to −0.45%, an inner radius $r_o$ and an outer radius, $r_1$, in the range from 5.0 $\mu$m to 6.7 $\mu$m, and, a second annular segment, surrounding the first annular segment, having a relative refractive index percent, $\Delta_3\%$, in the range from 0.235% to 0.55%, an outer radius, $r_3$, in the range from 7.5 $\mu$m to 11.0 $\mu$m, center radius, $r_c$, in the range from 7.0 $\mu$m to 9.6 $\mu$m, and width, $w_3$, in the range from 0.8 $\mu$m to 3.0 $\mu$m. In addition, this embodiment can further include a third annular segment, surrounding the first annular segment, having a relative refractive index percent, $\Delta_2\%$, in the range from zero to 0.15%, an inner radius $r_1$ and an outer radius, $r_2$, in the range from 5.9 $\mu$m to 8.0 $\mu$m. A preferred configuration of this embodiment is one in which the central segment is an $\alpha$-profile and $\alpha$ has a range from 0.8 to 3.5.

It will be understood that in each of the five aspects of the invention set forth in the summary immediately above the effective area is greater than 23 $\mu$m$^2$, preferably greater than 25 $\mu$m$^2$, and more preferably greater than a value in the range from 28 $\mu$m$^2$ to 30 $\mu$m$^2$. Also, induced attenuation under bending is as disclosed in the fourth aspect of the invention. Attenuation at 1550 nm is less than 0.25 dB/km and preferably less than 0.22 dB/km and polarization mode dispersion is less than 1.0 ps/km$^{1/2}$, preferably less than 0.05 ps/km$^{1/2}$, and more preferably less than 0.01 ps/km$^{1/2}$. The ratio $\kappa$ is in the range from 225 nm to 375 nm.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION OF THE INVENTION

Figure 1:
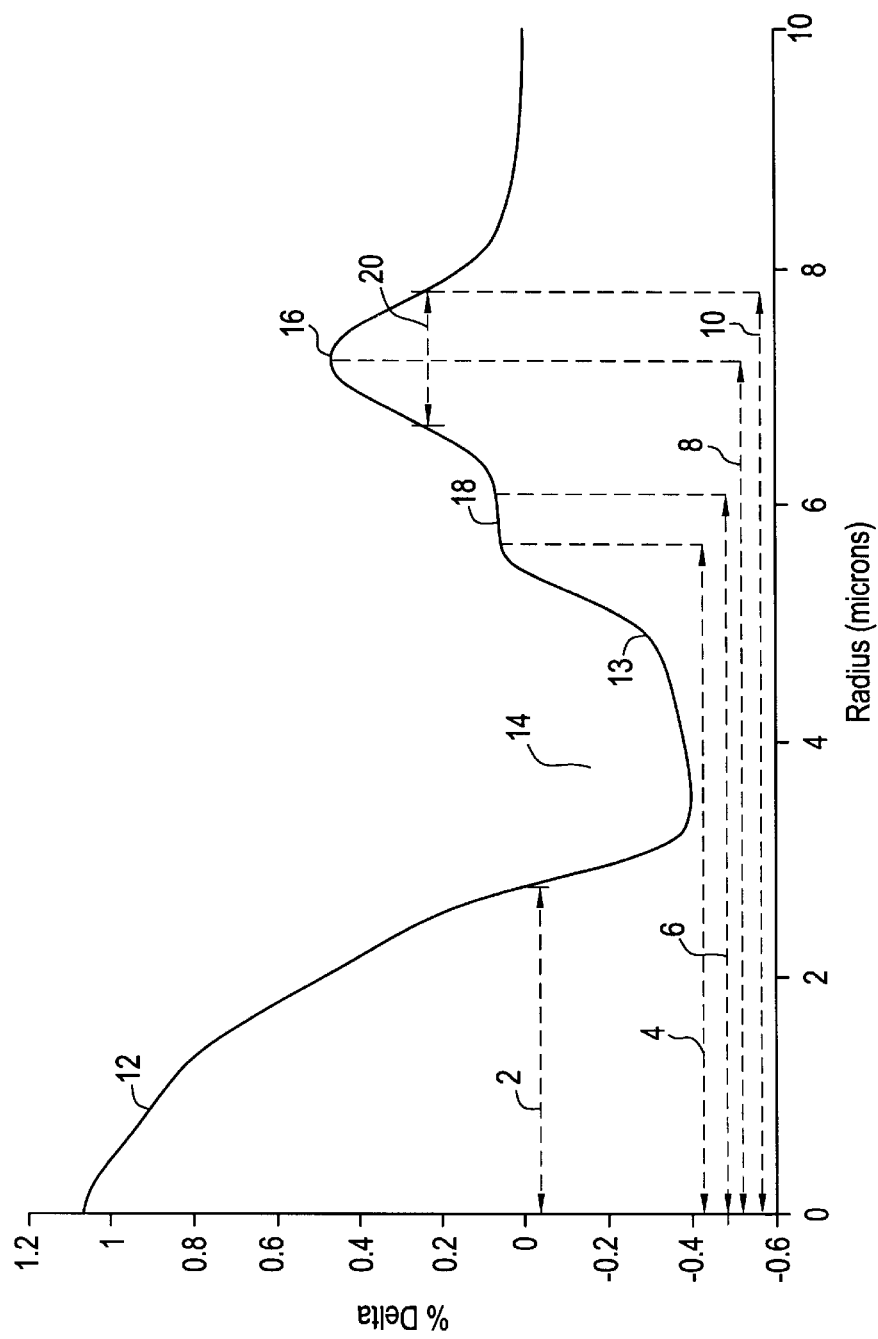
FIGS. 1–7, and 9, 11–14 and 16 are charts of refractive index profiles of segmented core optical waveguide fibers in accord with the invention.

Reference will now be made in detail to the present preferred embodiments of the invention, examples of which are illustrated in the accompanying drawings. Wherever possible, the same reference numbers will be used throughout the drawings to refer to the same or like parts. An exemplary embodiment of the dispersion compensating optical waveguide fiber in accord with the invention is shown in FIG. 1, which is a chart of the refractive index profile of a segmented core optical waveguide fiber. Central segment 12 has a positive relative refractive index, inner radius zero, and outer radius 2, measured from the profile centerline (all radii are measured relative to the profile centerline) to the point at which the central segment 12 profile crosses the horizontal line defined by $\Delta\%=0$. First annular segment 14 has a negative relative index, inner radius 2 and outer radius 4 measured to the point at which the ascending leg of segment 14 meets first point of horizontal second annular segment 18. In this and certain other embodiments disclosed and described below, segment 14 ramps upward from its minimum relative index value to a point 13 after which the slope of the ramp increases sharply and rises toward the horizontal chart axis. Second annular segment 18 has a positive relative index, inner radius 4, and outer radius 6 measured to the point at which the relative index percent begins to increase at the beginning of the rising leg of third annular segment 16. Radius 6 is also the inner radius of segment 16. The radial location of third annular segment 16 is described by radius 8 measured to the geometrical center of raised portion 16 and by radius 10 measured to the point at which the descending leg of third annular segment 16 reaches a relative index percent half that of segment 16. The relative index percent of segment 16 is by definition the maximum relative index percent of the segment so that radius 10 terminates at the half maximum relative index of segment 16. The third annular segment 16 has a half width 20 defined as the distance between the respective points of half maximum relative index percent on the ascending and descending leg of third annular segment 16. The definitions of radii 2, 4, 6, 8, and 10 and half width 20 will be used for each of the refractive index profiles disclosed and described herein with respect to FIGS. 2–7, 9, and 11–13, and will not be repeated in the description following and are not shown in the remaining figures in which embodiments of relative index profile versus radius are charted. These definitions of radii and half width can also be applied to the refractive index profile shown in FIG. 14 by altering slightly the definition of the inner radius 4 and outer radius 6 of second annular segment 18. In the embodiment of FIG. 14, segment 18 rises continuously beginning at the last point of segment 14 and so has no horizontal portion. Therefore inner radius 4 of second annular segment 18 terminates at the point at which the upward slope of the ascending leg of segment 14 abruptly changes to the lower slope of segment 18. Outer radius 6 of segment 18 terminates at the point where segment 18 reaches the half maximum relative index point of third annular segment 16.

Figure 2:
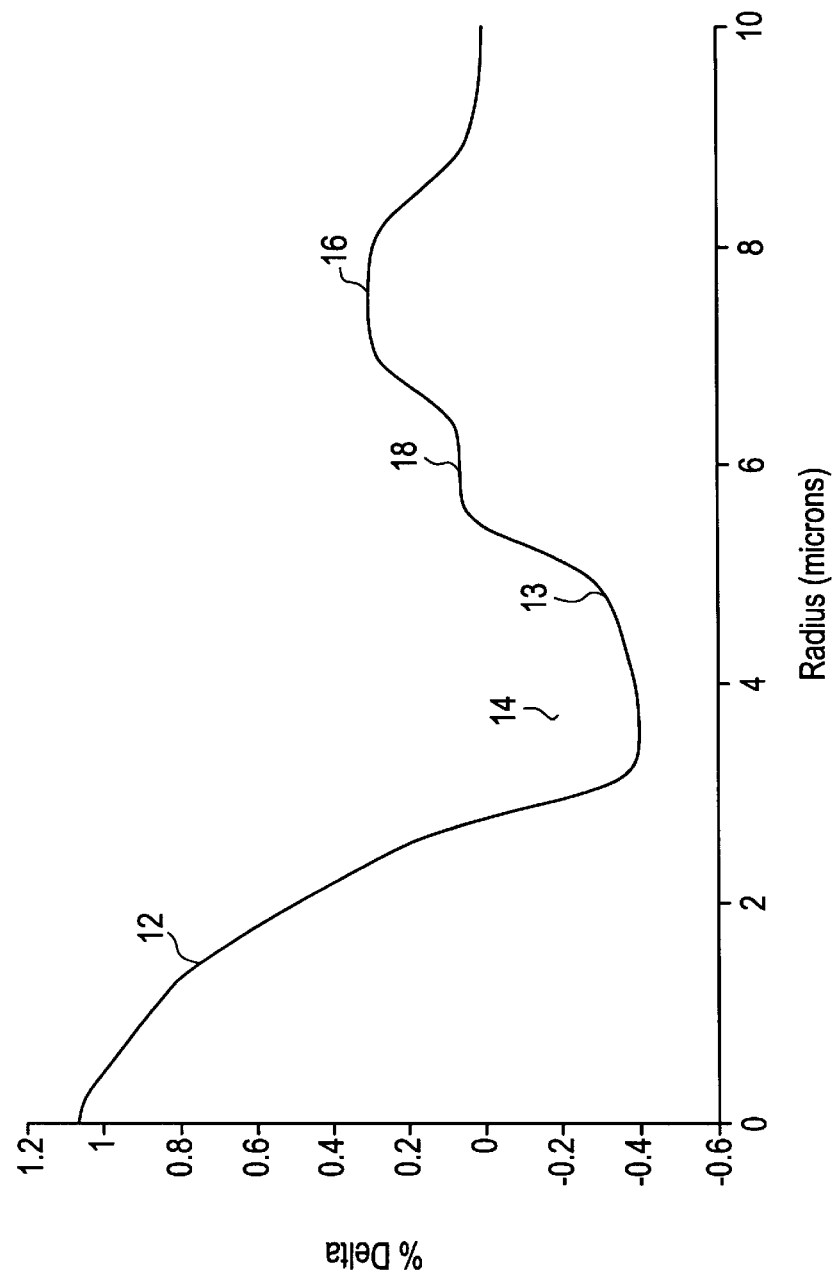

The segmented core refractive index profile charted in FIG. 2 has central segment 12, first annular segment 14, and second annular segment 18 similar to those of the profile depicted in FIG. 1. The rounding which is evident at the juncture of segment 12 and 14 and at the minimum point of segment 14 is due to dopant diffusion which occurs at relatively abrupt changes in relative refractive index, i.e., relatively abrupt changes in dopant concentration. The third annular segment 16 is lower in relative index percent and broadened compared to third annular segment 16 of the segmented core embodiment shown in FIG. 1. The impact of these changes in the segments is seen in Example 1 below.

The embodiment of the compensating waveguide fiber shown in FIG. 3 is again similar to that of FIG. 1 except that the bottom portion of the first annular segment 14 is flattened. The impact of this change is also set forth in Example 1 below.

Figure 3:
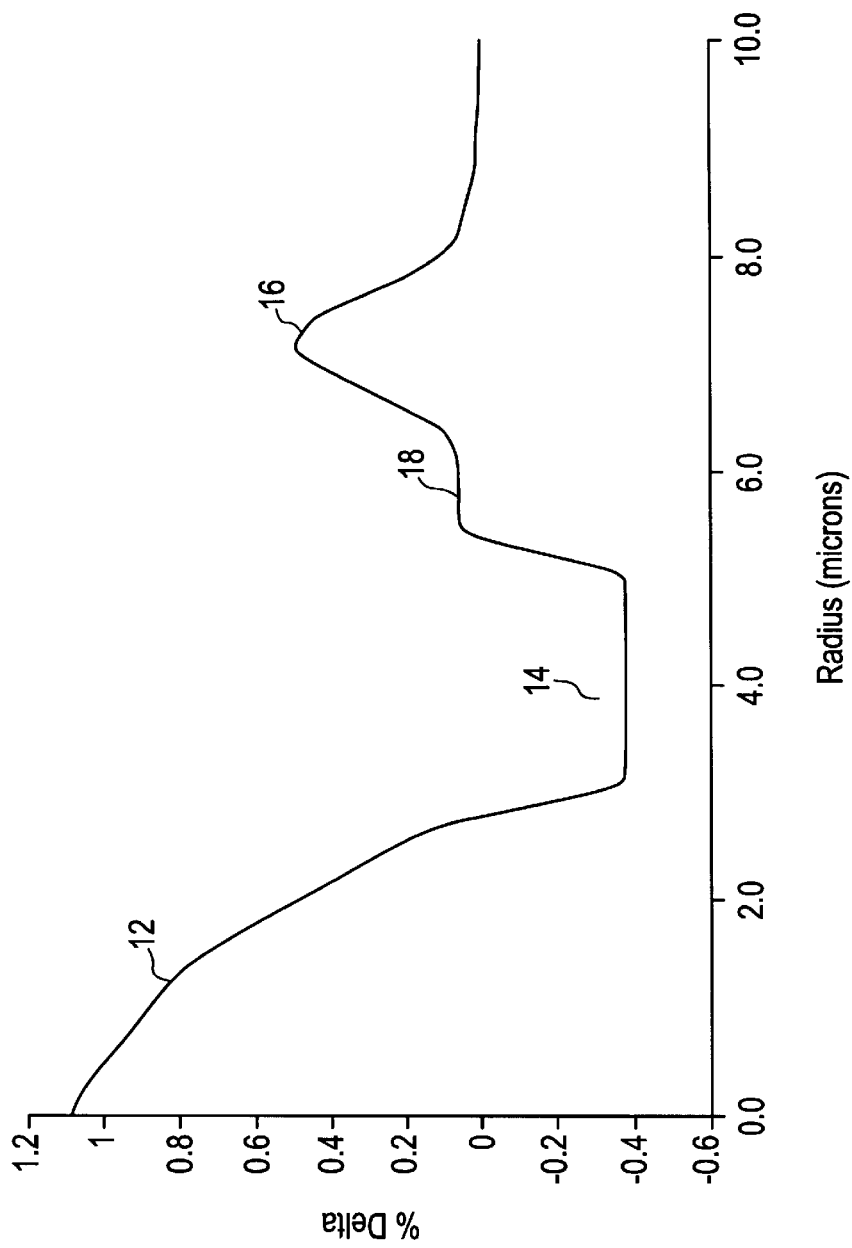
Figure 4:
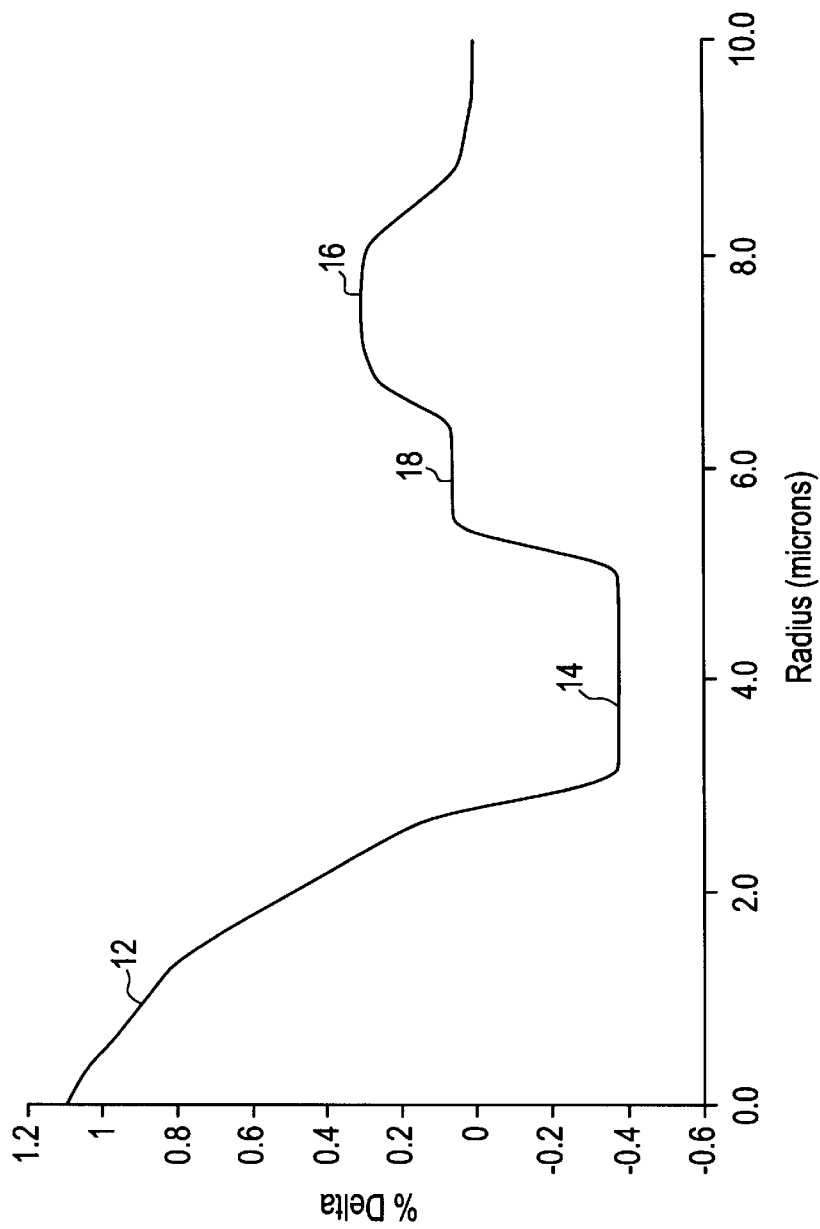

The embodiment of the compensation waveguide fiber shown in FIG. 4 is similar to that of FIG. 3 except that third annular segment 16 has been flattened relative to that of third annular segment 16 of FIG. 3.

Thus, a comparative examination of the refractive index profiles of FIGS. 1–4 serves to show the effect of broadening and flattening third annular segment 16 as well as the flattening of the bottom portion 13 of first annular segment 14 in FIGS. 1 and 2.

The respective profiles shown in FIGS. 1–4 have structure parameters taken from the ranges:

TABLE 1

| Parameter | FIG. 1 | FIG. 2 | FIG. 3 | FIG. 4 |
|---|---|---|---|---|
| $\Delta_0$ % | 1.08 | 1.08 | 1.08 | 1.08 |
| $r_0$ (μm) | 2.78 | 2.8 | 2.8 | 2.8 |
| $\Delta_1$ % | −.4 ramp to −.3 | −.4 rampt to −.3 | −.38 | −.38 |
| $r_1$ (μm) | 5.7 | 5.6 | 5.7 | 5.6 |
| $\Delta_2$ % | .06 | .05 | .06 | .05 |
| $r_2$ (μm) | 6.22 | 6.28 | 6.08 | 6.36 |
| $\Delta_3$ % | .5 | .3 | .5 | .3 |
| $r_c$ (μm) | 7.25 | 7.58 | 7.2 | 7.54 |
| $r_3$ (μm) | 7.8 | 8.53 | 7.73 | 8.48 |
| $w_3$ (μm) | 1.1 | 1.9 | 1.07 | 1.89 |

The properties of the optical waveguide fibers modeled using the Table 1 parameters are set forth in Table 2.

TABLE 2

| | FIG. 1 | FIG. 2 | FIG. 3 | FIG. 4 |
|---|---|---|---|---|
| Total Dispersion @ 1550nm (ps/nm-km) | −17.5 | −16.3 | −16.3 | −15.5 |
| Total Dispersion Slope at 1550 nm (ps/nm²-km) | −0.055 | −0.057 | −0.054 | −0.058 |
| Effective Area 1550 nm (μm²) | 27.8 | 27.5 | 27.5 | 27.2 |
| Attenuation at 1550 nm (dB/km) | 0.217 | 0.216 | 0.217 | 0.216 |
| Fiber Cutoff (nm) | 1742 | 1765 | 1736 | 1762 |
| Pin Array Bend Loss at 1550 nm (dB) | 1.4 | 1.4 | 1.3 | 1.4 |
| Lateral Load (dB/m) | 0.15 | 0.16 | 0.15 | 0.17 |
| Ratio κ (nm) | 318.2 | 286.0 | 301.9 | 267.2 | central segment 12 relative index percent, $\Delta_o$%, in the range from 1.0% to 1.2%, and radius 2, $r_o$, in the range from 2.6 μm to 3.0 μm;

first annular segment 14 relative index percent, $\Delta_1$%, in the range from −0.35% to −0.42%, and radius 4, $r_1$, in the range from 5.2 μm to 5.8 μm;

second annular segment 18 relative index percent, $\Delta_2$, in the range from zero to 0.08%, inner radius equal to $r_1$, and outer radius 6, $r_2$, in the range from 5.9 μm to 6.7 μm; and, third annular segment 16 relative index percent, $\Delta_3$% in the range from 0.25% to 0.55%, inner radius $r_2$, center radius 8, $r_c$, in the range from 7.0 μm to 7.9 μm, width, $w_3$ in the range from 1.0 μm to 2.0 μm and outer radius 10, $r_3$, in the range from 7.5 μm to 7.6 μm.

EXAMPLE 1

Profiles where modeled based upon the relative refractive index percent versus radius shown in FIGS. 1–4. The structure parameters of each of the four profiles are set forth in Table 1. With reference to FIGS. 1 and 2, the relative index percent Δ% is stated as the value having maximum magnitude, in accord with the standard definition of relative index percent, ramping to the value of relative index percent at point 13 of segment 14 as defined above. It will be understood that, in all cases, the computer model takes into account the shape of the segments. The ramp value is stated in Table 1 for comparison purposes only.

The main effect of broadening and flattening of third annular segment 6 is to decrease κ, increase total dispersion slope, and increase fiber cutoff wavelength. The "fiber cutoff" wavelength is generally 200 nm to 400 nm higher than cut off wavelength of the fiber measured or modeled in cable form. Each of the cutoff wavelengths set forth in Table 2 therefore satisfy the operating conditions for the systems in which they will be used. The attenuation of each of these four embodiments is exceptionally low and the effective area is relatively high in comparison to other compensating fiber designs. The pin array bend loss compares favorably with that of standard step index optical waveguide fiber which typically is specified to be less than 8.0 dB/m. Lateral load bend induced loss is also low. The values of the ratio of total dispersion to total dispersion slope, κ, fit well with the κ values of high performance transmission fiber which typically have a value in the range from 270 nm to 320 nm.

A further embodiment of the compensation optical waveguide fiber in accord with the invention has segmented core structure ranges:

central segment 12 relative index percent, $\Delta_o$%, in the range from 0.8% to 1.05%, and radius 2, $r_o$, in the range from 2.5 μm to 3.2 μm;

first annular segment 14 relative index percent, $\Delta_1$%, in the range from −0.34% to −0.42%, and radius 4, $r_1$, in the range from 5.4 μm to 6.0 μm;

second annular segment 18 relative index percent, $\Delta_2$, in the range from zero to 0.05%, inner radius equal to $r_1$, and outer radius 6, $r_2$, in the range from 6.6 μm to 7.5 μm; and, third annular segment 16 relative index percent, $\Delta_3$, in the range from 0.38% to 0.5%, inner radius $r_2$, center radius 8, $r_c$, in the range from 7.6 µm to 8.2 µm, width 20, $w_3$, in the range from 0.93 µm to 1.70 µm, and outer radius 10, $r_3$, in the range from 8.3 µm to 9.0 µm.

EXAMPLE 2

Figure 5:
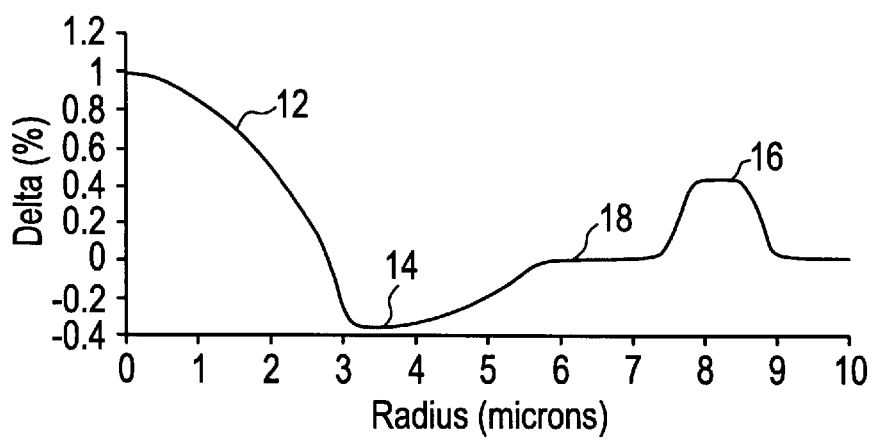
Figure 7:
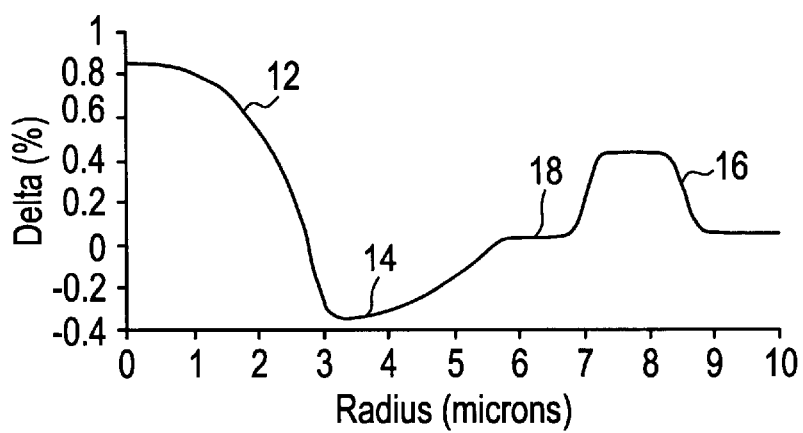
Figure 6:
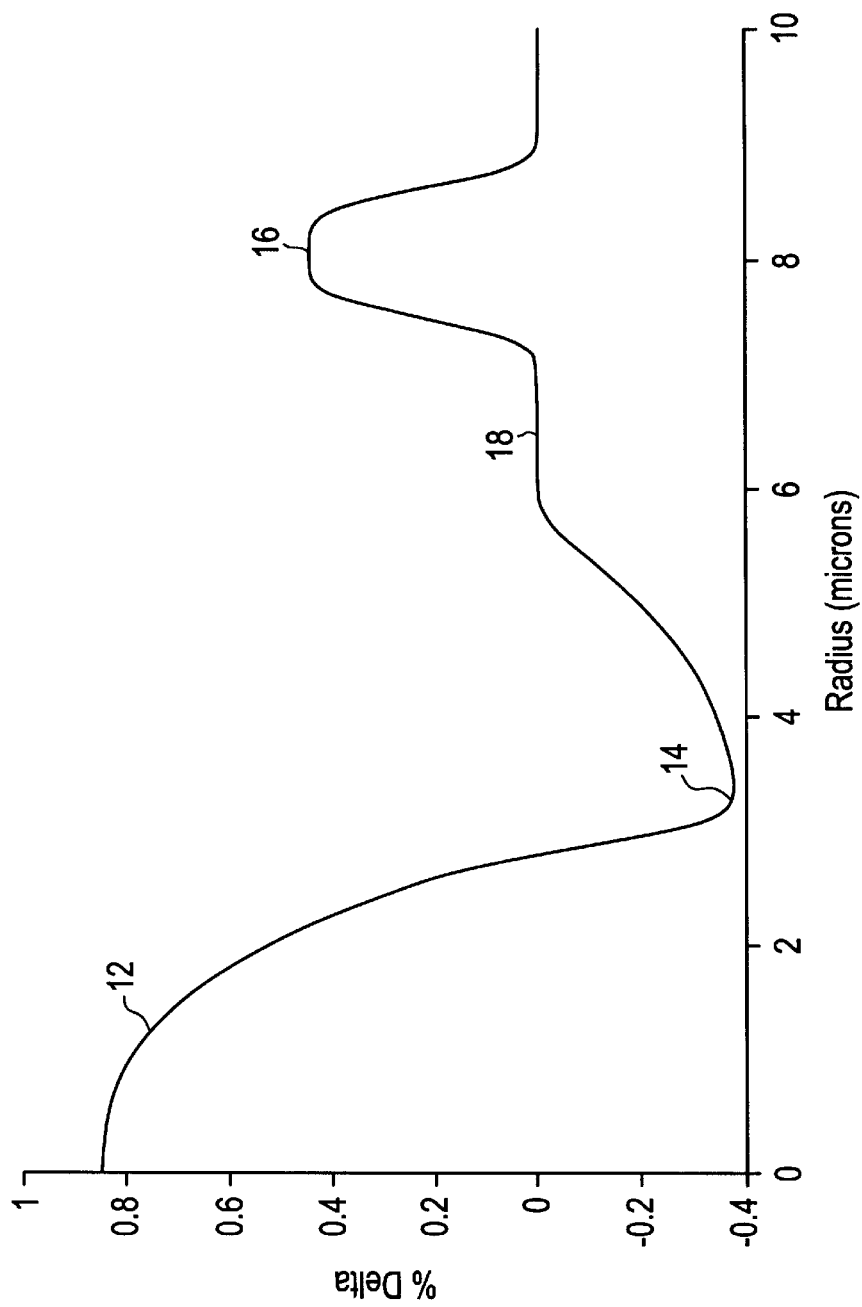

Particular embodiments of the segmented core optical waveguide fibers having structural parameters in the ranges set forth immediately above are shown in FIGS. 5–7. The parameter values for these respective profiles are set forth in Table 3.

TABLE 3

| Parameter | FIG. 5 | FIG. 6 | FIG. 7 |
|---|---|---|---|
| $\Delta_0$ % | 1.0 | 0.85 | 0.85 |
| $r_0$ (µm) | 2.8 | 2.8 | 2.8 |
| $\Delta_1$ % (min.) | −.38 | −.38 | −.38 |
| $r_1$ (µm) | 5.7 | 5.7 | 5.7 |
| $\Delta_2$ % | 0 | 0 | 0 |
| $r_2$ (µm) | 7.31 | 7.13 | 6.79 |
| $\Delta_3$ % | .45 | .47 | .4 |
| $r_c$ (µm) | 8.20 | 8.05 | 7.83 |
| $r_3$ (µm) | 8.76 | 8.61 | 8.58 |
| $w_3$ (µm) | 1.13 | 1.13 | 1.5 |

The properties of the optical waveguide fibers modeled using the Table 3 parameters are set forth in Table 4.

TABLE 4

| Parameter | FIG. 5 | FIG. 6 | FIG. 7 |
|---|---|---|---|
| Total Dispersion @ 1550nm (ps/nm-km) | −16.0 | −16.2 | −16.0 |
| Total Dispersion Slope at 1550 nm (ps/nm$^2$-km) | −0.06 | −0.06 | −0.057 |
| Effective Area 1550 nm (µm$^2$) | 28.8 | 31.5 | 31.2 |
| Attenuation at 1550 nm (dB/km) | 0.215 | 0.216 | 0.217 |
| Fiber Cutoff nm | 1760 | 1733 | 1771 |
| Pin Array Bend Loss at 1550 nm (dB) | 4.0 | 7.15 | 3.2 |
| Lateral Load (dB/m) | 0.44 | 0.74 | 0.48 |
| Ratio κ nm | 266.7 | 270 | 280.7 |

Each of the refractive index profile designs in this example exhibit the desired total dispersion and total dispersion slope while maintaining excellent attenuation values and appropriate cut off wavelength. The effective area is relatively high in comparison to that of other compensating optical waveguide fiber designs, which typically have an effective area at 1550 nm of about 25 µm$^2$. The narrowing and inward displacement of third annular segment 16 in FIG. 6 results in higher pin array bending induced loss. However, the modeled loss is still less than that specified for standard step index fiber.

A remarkable feature of optical waveguide fibers made in accord with the parameters set forth in Table 3 is that, in addition to the performance parameters as shown in Table 4, the fibers offer compensation over an extended wavelength range. This extended wavelength range performance is shown in FIG. 8. and is described in the following link example.

EXAMPLE 3

A span of optical waveguide fiber is formed using 50 km of transmission optical waveguide fiber, having a total dispersion at 1550 nm of 18.7 ps/nm-km, an effective area at 1550 nm in the range of 80 to 110 µm$^2$, and a total dispersion slope at 1550 nm of 0.06 ps/nm$^2$-km, optically coupled to 50 km of compensating fiber made in accord with one of the embodiments shown in FIGS. 5–7 and described in Example 2.

Figure 8:
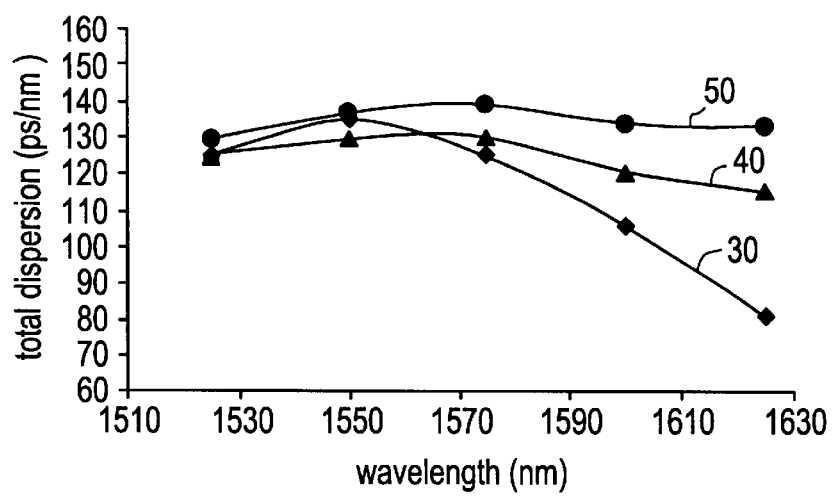
FIG. 8 is a chart of accumulated dispersion versus wavelength for the respective refractive index profiles embodied in FIGS. 5–7.

Referring to FIG. 8, curve 30 is a chart of accumulated total dispersion versus wavelength for a span in which the compensating fiber is made in accord with the refractive index profile given in FIG. 5. Accumulated dispersion is defined at the sum of total dispersion times length for each fiber in the span. For the span using the compensating fiber of FIG. 5, the accumulated total dispersion at 1550 nm is, (50 km×18.7 ps/nm-km)+(50 km×[−16 ps/nm-km])=135 ps/nm. Curve 30 of FIG. 8, shows accumulated dispersion over the wavelength range of about 1525 nm to 1575 nm is within the range of about 130 ps/nm+/−5 ps/nm. The performance of the span in the higher wavelength window from about 1580 nm to 1625 nm is outside this range, but is still acceptable in certain communication systems. The fiber embodied in FIG. 5 provides compensation for a wavelength division multiplexed system having channels that extend over a range of at least 1525 nm to 1575 nm, with adequate compensation, in some cases, for systems using wavelengths as high as 1625 nm.

The same span made using the embodiment of the compensating optical waveguide fiber of FIG. 6 again provides compensation over a range of wavelengths from 1525 nm to 1625 nm as shown by curve 40. This span provides accumulated dispersion of 127 ps/nm+/−3 ps/nm over the wavelength range 1525 nm to 1575 nm, accumulated dispersion of 125 ps/nm +/−5 ps/nm over the wavelength range 1525 nm to 1600 nm, with the accumulated dispersion falling only to 115 ps/nm at the 1625 nm wavelength. The fiber made in accord with the embodiment of FIG. 6 therefore provides improved compensation in comparison to the embodiment of FIG. 5.

The same span made using the embodiment of the compensating fiber made in accord with FIG. 7 provides substantially equal compensation over the entire band from 1525 nm to 1625 nm as is seem from curve 50 in FIG. 8. In this embodiment of the span, the accumulated dispersion over channels having a wavelength over the entire 1525 nm to 1625 nm band is 135 ps/nm +/−5 ps/nm.

Each of the three embodiments of the span provides for substantially equal compensation of channels over an extended wavelength range of operation. Such compensation over a wide wavelength range serves to enable high data rate, long haul, wavelength division multiplexed telecommunications systems.

Any of the fibers disclosed herein can be employed in a fiber link that in turn is uses in a telecommunications system, such as, for example, a multi channel WDM system. Preferably, the fibers disclosed herein are employed in a cabled link, which is to say that they are not employed in a dispersion compensating module.

In a preferred embodiment, the fibers herein are employed in a fiber link together with a step index single mode fiber which exhibits positive dispersion at 1550 nm and an effective area greater than 70, more preferably greater than 80, and most preferably greater than 90 square microns at 1550 nm, such as is disclosed in U.S. Provisional Application Nos. 60/254,909 and 60/276,350, both of which are hereby incorporated by reference in their entirety. In one particularly preferred embodiment, the fiber link is located between a pair of erbium doped fiber amplifiers with one end of the large effective area, positive dispersion fiber located at the amplifier output side and the other optically coupled to the dispersion compensation fiber of the present invention. Having the large effective area fiber disposed at the location of highest optical power minimizes nonlinear effects such as cross phase modulation and four wave mixing in the link. In another preferred embodiment, the fiber link is located between a pair of hybrid amplifiers which are capable of erbium doped fiber amplification in the forward propagating direction and Raman amplification in the backward propagating direction. The link which is disposed between the two amplifiers includes a length of the dispersion compensating fiber of the present invention located between two lengths of the large effective area, positive dispersion fiber. Having the large effective area fiber disposed at both ends of the fiber link facilitates both transmission of the signal which is amplified by the erbium doped fiber amplifier, and Raman pumping of the signal by the Raman pump amplifier. Preferably, the two lengths of positive dispersion fiber employed in the link are of relatively equal length.

An inclusive statement of an embodiment of the invention is for dispersion compensating optical waveguide fibers total dispersion having properties total dispersion in a range from −12 ps/nm-km to −22 ps/nm-km, total dispersion slope in a range from −0.04 ps/nm$^2$-km to −0.08 ps/nm$^2$-km, and, effective area greater than 25 $\mu$m$^2$, the corresponding profile structure is a segmented core having

- a central segment having a relative refractive index percent, $\Delta_o\%$, in the range from 0.80% to 1.20%, an inner radius zero and an outer radius, $r_o$, in the range from 2.5 $\mu$m to 3.2 $\mu$m;
- a first annular segment, surrounding the central segment, having a relative refractive index percent, $\Delta_1\%$, in the range from −0.30% to −0.44%, an inner radius $r_o$ and an outer radius, $r_1$, in the range from 5.25 $\mu$m to 6.4 $\mu$m; and,
- a second annular segment, surrounding the first annular segment, having a relative refractive index percent, $\Delta_3\%$, in the range from 0.27% to 0.5%, an outer radius, $r_3$, in the range from 7.7 $\mu$m to 11.0 $\mu$m, center radius, $r_c$, in the range from 7.0 $\mu$m to 9.6 $\mu$m, and width, $w_3$, in the range from 0.9 $\mu$m to 3.0 $\mu$m. Typically, the profile structure further includes a third annular segment, surrounding the first annular segment, having a relative refractive index percent, $\Delta_2\%$, in the range from zero to 0.1%, an inner radius $r_1$ and an outer radius, $r_2$, in the range from 6.0 $\mu$m to 7.85 $\mu$m.

An embodiment of this structure is one in which the central segment is an α-profile and α has a range from 1.0 to 2.2, and $\Delta_o\%$ has a range from 1.0% to 1.2%.

In a further embodiment of this structure the central segment is an α-profile and α has a range from 2.2 to 3.5, $\Delta_o\%$ in the range from 0.8% to 1.0%, and effective area greater than 30 $\mu$m$^2$.

For the embodiments of the invention immediately above the value of κ has a range from 250 nm to 350 nm.

Figure 9:
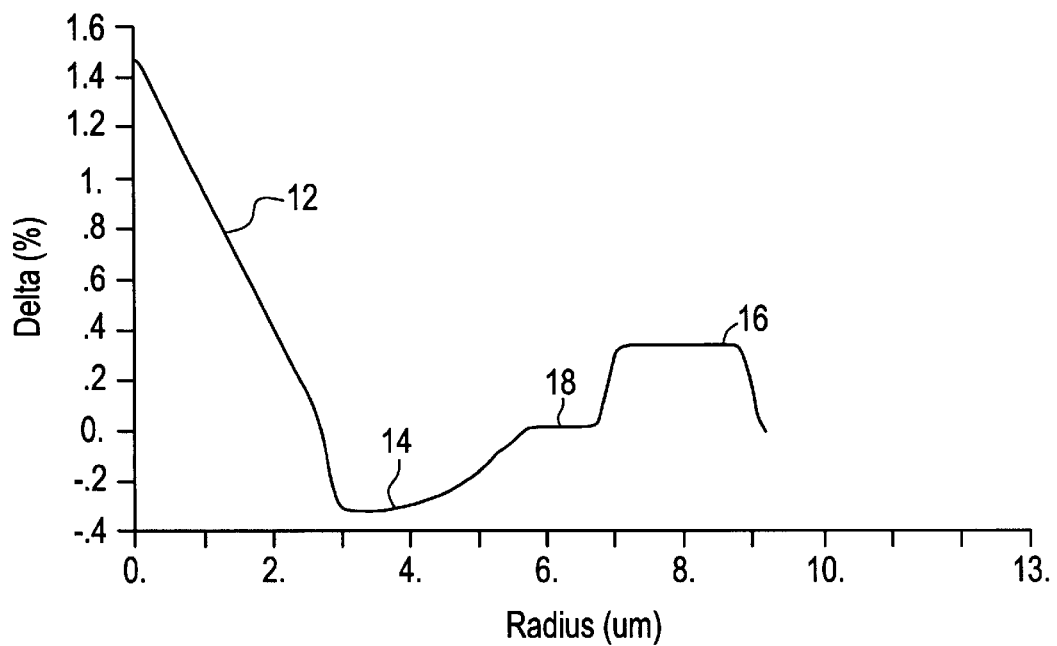

A further embodiment of an optical waveguide fiber in accord with the invention is shown in FIG. 9. In this embodiment, the structure parameters have ranges:

central segment 12 relative index percent, $\Delta_o\%$, in the range from 1.4% to 1.6%, and radius 2, $r_o$, in the range from 2.6 $\mu$m to 3.0 $\mu$m;

first annular segment 14 relative index percent, $\Delta_1\%$, in the range from −0.28% to −0.36%, and radius 4, $r_1$, in the range from 5.1 $\mu$m to 6.0 $\mu$m;

second annular segment 18 relative index percent, $\Delta_2$, in the range from zero to 0.05%, inner radius equal to $r_1$, and outer radius 6, $r_2$, in the range from 6.3 $\mu$m to 7.7 $\mu$m; and, third annular segment 16 relative index percent, $\Delta_3$ in the range from 0.235% to 0.4%, inner radius $r_2$, center radius 8, $r_c$, in the range from 7.5 $\mu$m to 8.5 $\mu$m, width 20, $w_3$, in the range from 1.8 $\mu$m to 2.4 $\mu$m, and outer radius 10, $r_3$, in the range from 8.5 $\mu$m to 9.5 $\mu$m.

EXAMPLE 4

A particular embodiment of a segmented core optical waveguide fiber having structural parameters in the ranges set forth immediately above can be taken from FIG. 9 and are set forth in Table 5.

TABLE 5

| Parameter | FIG. 9 |
|---|---|
| $\Delta_0\%$ | 1.56 |
| $r_0$ ($\mu$m) | 2.8 |
| $\Delta_1\%$ (min.) | −.32 |
| $r_1$ ($\mu$m) | 5.58 |
| $\Delta_2\%$ | 0 |
| $r_2$ ($\mu$m) | 6.88 |
| $\Delta_3\%$ | .35 |
| $r_c$ ($\mu$m) | 7.94 |
| $r_3$ ($\mu$m) | 9.1 |
| $w_3$ ($\mu$m) | 2.1 |

The properties of the optical waveguide fiber modeled using the Table 5 parameters are set forth in Table 6.

TABLE 6

| Parameter | FIG.9 |
|---|---|
| Total Dispersion @ 1550nm (ps/nm-km) | −28.1 |
| Total Dispersion Slope at 1550 nm (ps/nm$^2$-km) | −0.087 |
| Effective Area 1550 nm ($\mu$m$^2$) | 26. 1 |
| Attenuation at 1550 nm (dB/km) | 0.217 |
| Fiber Cutoff (nm) | 1850 |
| Pin Array Bend Loss at 1550 nm (dB) | 0.66 |
| Lateral Load Loss dB/m | 0.204 |
| Ratio κ nm | 324 |

In this embodiment, the attenuation is again excellent as is the pin array bend loss. The reduction in effective area in comparison to the embodiments disclosed and described above can be reduced in impact because the length ratio at which this compensating fiber can be used is 1.5:1. The higher effective area transmission fiber makes up a greater fraction of the overall span length. In comparison to the spans using a 1:1 ratio of transmission fiber length to compensating fiber length, a signal traversing the compensating fiber of Example 4 will be lower in power upon entering the compensating fiber, thereby reducing the impact of the relatively lower effective area.

Figure 10:
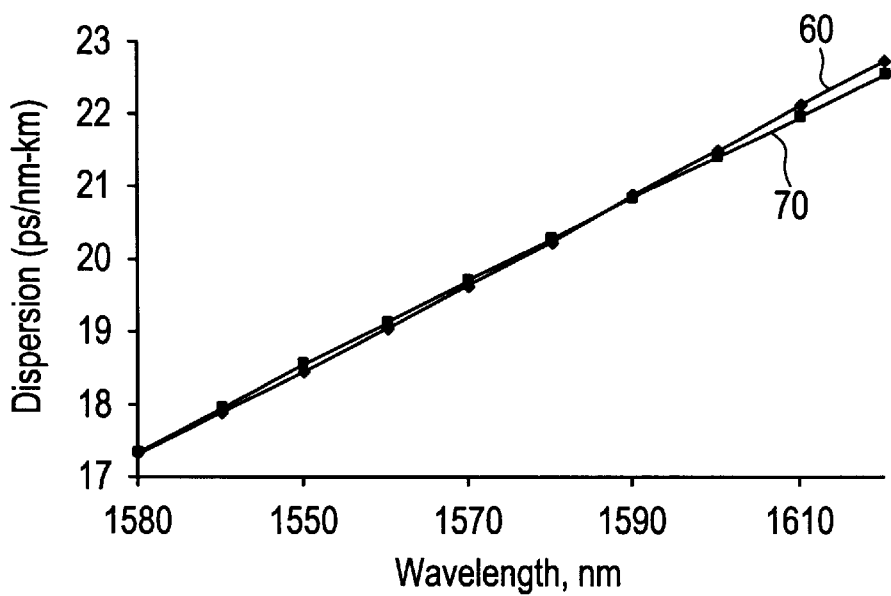
FIG. 10 is a chart of total dispersion versus wavelength comparing a transmission fiber to the compensating fiber embodied in FIG. 9.

The total dispersion versus wavelength of the compensating fiber in accord with Example 4 is shown as curve 60 in FIG. 10. Curve 70 is the total dispersion versus wavelength curve for a transmission fiber having high effective area, typically greater than 100 $\mu$m$^2$. This transmission fiber also exhibits the desired low attenuation and has a positive total dispersion and total dispersion slope. Such a transmission fiber is disclosed and described in U.S. Provisional Application S. No. 60/254,909 and in U.S. Provisional Application S. No. 60/276,350 each of which are incorporated herein by reference in their entirety.

In order to compare transmission fiber curve 70 to compensating fiber curve 60, the absolute value of the total dispersion of the compensating fiber has been charted. Also, curve 60 has been shifted to lower total dispersion values in accord with the 1.5:1 length ratio for which the compensating fiber is designed. Over the wavelength range 1530 nm to 1620 nm the curves 60 and 70 substantially coincide, the maximum deviation of less than 0.2 ps/nm-km occurring near the higher end of the wavelength range.

For a 100 km optical waveguide fiber span made up of 60 km of the transmission fiber and 40 km of the compensating fiber in accord with Example 4, the compensation at each wavelength over the range 1530 nm to 1620 nm is equal to within 8 ps/nm. Because curves 60 and 70 cross, the average difference in compensation over the full wavelength range is less than 8 ps/nm.

It will be understood that the spans disclosed and described herein may be used in optical connection with one another to form a telecommunications link, which includes a transmitter and receiver and typically can incorporate a variety of other components such as optical amplifiers, couplers, pump lasers, wavelength division multiplexing devices, and electro-optical regenerators.

An inclusive statement of this embodiment of the invention is for dispersion compensating optical waveguide fibers having total dispersion in a range from −24 ps/nm-km to −35 ps/nm-km, total dispersion slope in a range from −0.08 ps/nm²-km to −0.11 ps/nm²-km, effective area greater than 25 $\mu m^2$, and pin array bend loss is less than 7 dB, the profile structure includes a segmented core region having: a central segment having relative index percent in the range from 1.4% to 1.7%, an inner radius zero outer radius, $r_o$, in the range from 2.6 $\mu m$ to 3.0 $\mu m$;

a first annular segment, surrounding the central segment, having relative index percent in the range from −0.28% to −0.36%, inner radius $r_o$ and outer radius, $r_1$, in the range from 5.1 $\mu m$ to 6.0 $\mu m$; and, a second annular segment, surrounding the first annular segment, having relative index percent in the range from 0.235% to 0.4%, a center radius in the range from 7.5 $\mu m$ to 8.5 $\mu m$, outer radius in the range from 8.5 $\mu m$ to 9.5 $\mu m$, and width, $w_3$, in the range from 1.5 $\mu m$ to 2.5 $\mu m$.

This embodiment of dispersion compensating optical waveguide fiber typically can further include a third annular segment, surrounding the first annular segment, having relative index percent in the range from zero to 0.05%, inner radius $r_1$, and outer radius, $r_2$, in the range from 6.3 $\mu m$ to 7.7 $\mu m$.

The embodiment can have a central segment having an α-profile and α has a range from 0.8 to 1.2.

A typical value of κ for these embodiments described immediately above has a range from 275 nm to 375 nm.

EXAMPLE 5

Figure 11:
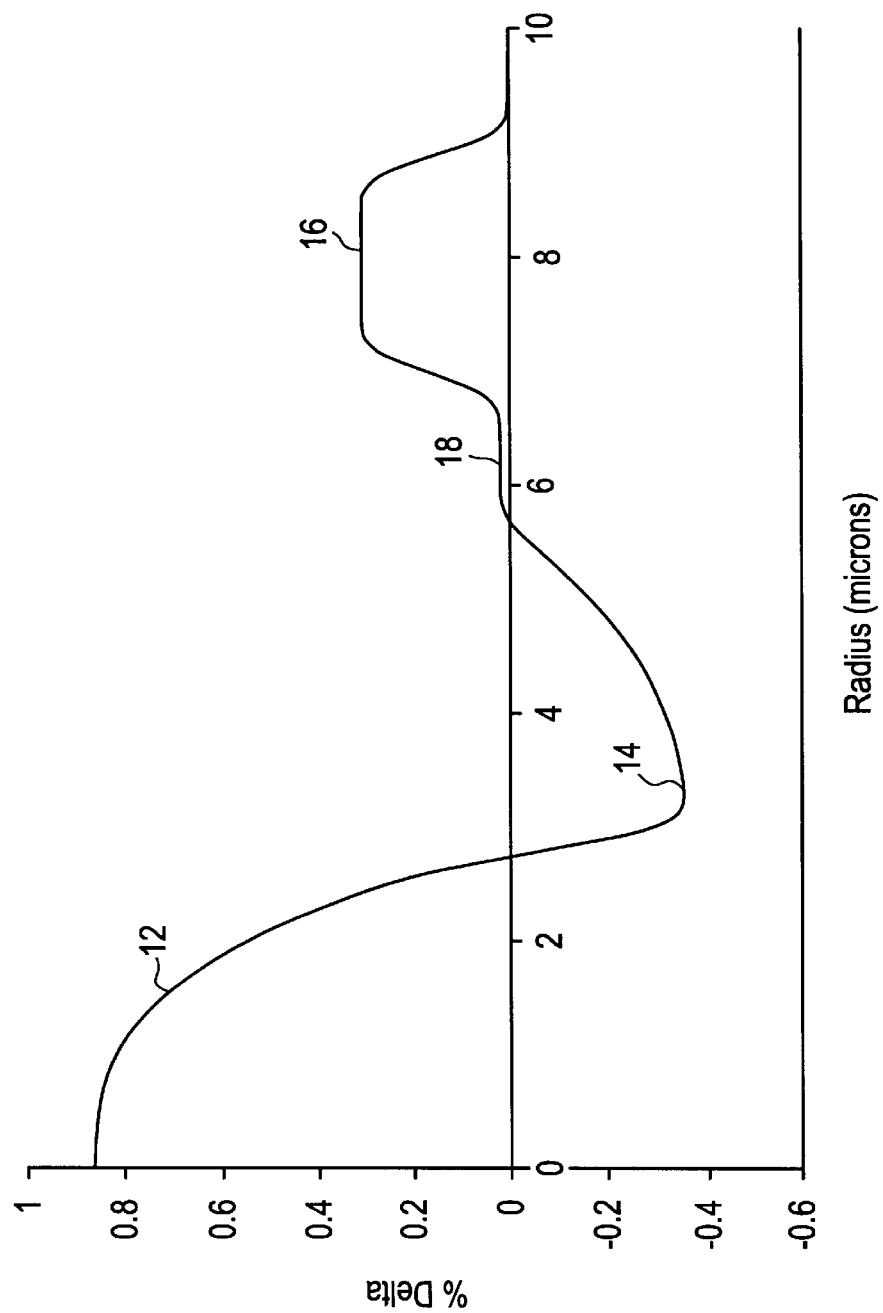

A further embodiment of the invention is shown in FIG. 11. In this embodiment, the modeled waveguide fiber properties at 1550 nm are: total dispersion −18.7 ps/nm-km, total dispersion slope −0.059 ps/nm²-km, attenuation 0.217 dB/km, effective area 31.6 $\mu m^2$, cutoff wavelength 1777 nm, pin array bend induced attenuation 3.8 dB, lateral load bend induced attenuation 0.59 dB/m, and κ of 317.

The refractive index profile is characterized by $\Delta_o\%$ of 0.86%, $r_o$ of 2.73 $\mu m$, $\Delta_1\%$ of −0.36%, $r_1$ of 5.9 $\mu m$, $\Delta_2\%$ of zero, $r_2$ of 6.65 $\mu m$, $\Delta_3\%$ of 0.3%, $r_c$ of 7.94 $\mu m$, $w_3$ of 1.91 $\mu m$, and $r_3$ of 8.89.

EXAMPLE 6

Figure 12:
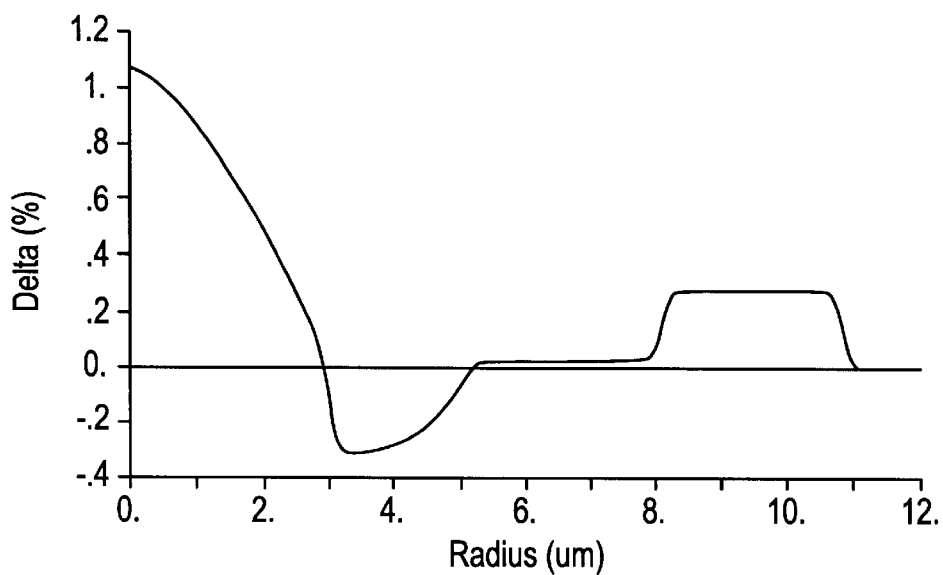

A further embodiment of the invention is shown in FIG. 12. In this embodiment, the modeled waveguide fiber properties at 1550 nm are: total dispersion −16.3 ps/nm-km, total dispersion slope −0.058 ps/nm²-km, attenuation 0.213 dB/km, effective area 29.9 $\mu m^2$, cutoff wavelength 1702 nm, pin array bend induced attenuation 1.15 dB, lateral load bend induced attenuation 0.26 dB/m, and κ of 280.

The refractive index profile is characterized by $\Delta_o\%$ of 1.08%, $r_o$ of 3.03 $\mu m$, $\Delta_1\%$ of −0.32%, $r_1$ of 5.3 $\mu m$, $\Delta_2\%$ of zero, $r_2$ of 7.8 $\mu m$, $\Delta_3\%$ of 0.27%, $r_c$ of 9.45 $\mu m$, $w_3$ of 2.72 $\mu m$, and $r_3$ of 10.8.

EXAMPLE 7

Figure 13:
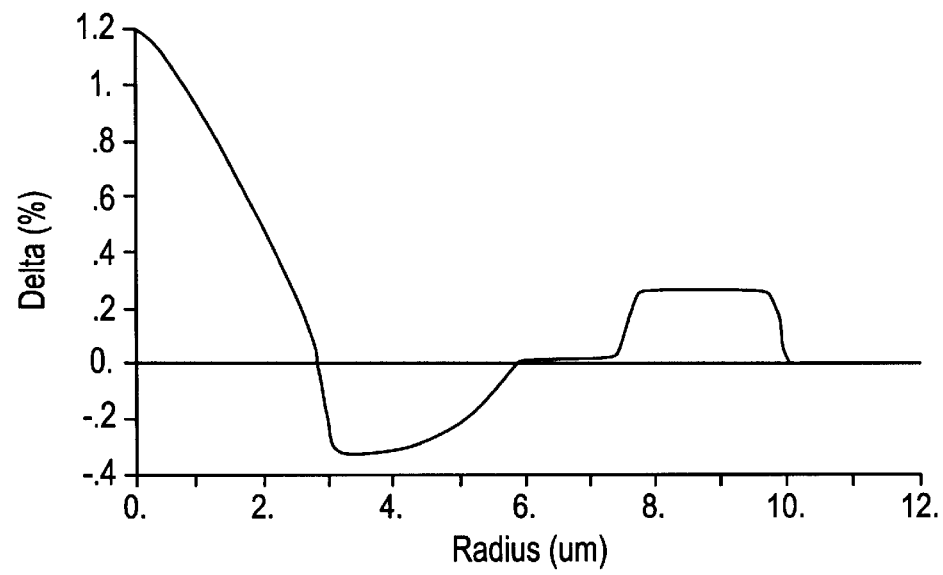
Figure 14:
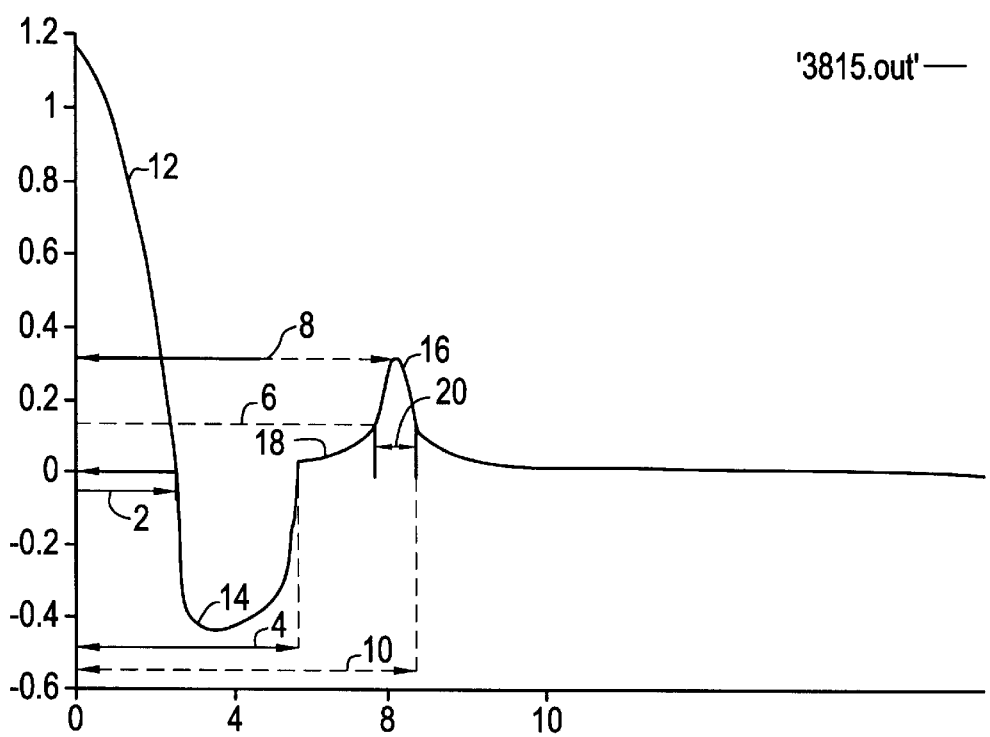

A further embodiment of the invention is shown in FIG. 13. In this embodiment, the modeled waveguide fiber properties at 1550 nm are: total dispersion −16.13 ps/nm-km, total dispersion slope −0.059 ps/nm²-km, attenuation 0.214 dB/km, effective area 27.1 $\mu m^2$, cutoff wavelength 1891 nm, pin array bend induced attenuation 0.87 dB, lateral load bend induced attenuation 0.27 dB/m, and κ of 275.

The refractive index profile is characterized by $\Delta_o\%$ of 1.2%, $r_o$ of 2.94 $\mu m$, $\Delta_1\%$ of −0.32%, $r_1$ of 5.9 $\mu m$, $\Delta_2\%$ of zero, $r_2$ of 7.3 $\mu m$, $\Delta_3\%$ of 0.29%, $r_c$ of 8.7 $\mu m$, $w_3$ of 2.33 $\mu m$, and $r_3$ of 9.86 $\mu m$.

The embodiment of the invention illustrated in FIG. 14 can be characterized as having a central segment of relative index percent in the range from 0.6% to 1.2%, preferably, 0.8% to 1.2%, a first annular segment of relative index percent in the range from −0.32% to −0.50%, preferably, −0.4% to −0.45%, and a second annular segment of relative index percent in the range of 0.28% to 0.35%. The respective radii associated with this embodiment are for the central segment an inner radius zero and outer radius, $r_o$, in the range 2.20 $\mu m$ to 2.70 $\mu m$, for the first annular segment an inner radius $r_o$ and outer radius, $r_1$, in the range 5.4 $\mu m$ to 6.2 $\mu m$, for the second annular segment inner radius $r_1$ and outer radius, $r_2$, in the range from 7.1 $\mu m$ to 7.9 $\mu m$, and for the third annular segment, an inner radius $r_2$, a center radius in the range 7.6 $\mu m$ to 8.4 $\mu m$, a width, $w_3$ in the range from 0.8 $\mu m$ to 1.2 $\mu m$, and an outer radius $r_3$ in the range from 8.2 $\mu m$ to 8.8 $\mu m$.

In an embodiment in accord with the embodiment of FIG. 14 described immediately above, the second annular segment includes a concave upward curve, beginning at $r_1$ and joining smoothly the third annular segment at $r_2$. The third annular segment can be chosen to have an α-profile having a range of α values from 0.8 to 2.1.

EXAMPLE 8

Figure 16:
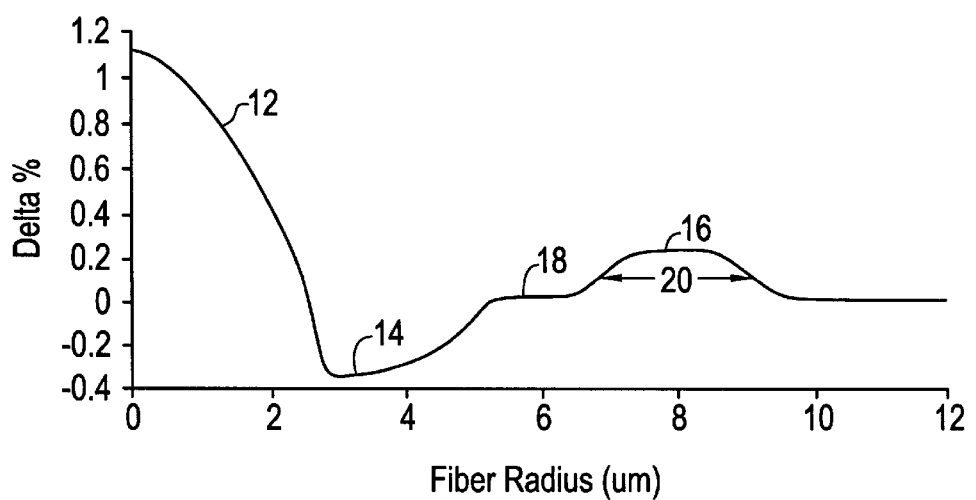

A further embodiment of the invention is shown in FIG. 16. In this embodiment, the modeled waveguide fiber properties at 1550 nm are: total dispersion −29.55 ps/nm-km, total dispersion slope −0.086 ps/nm²-km, attenuation 0.219 dB/km, effective area 27.96 $\mu m^2$, cutoff wavelength 1520 nm, pin array bend induced attenuation 4.73 dB, lateral load bend induced attenuation 0.57 dB/m, and κ of 343.

The refractive index profile is characterized by $\Delta_o\%$ of 1.24%, $r_o$ of 2.65 $\mu m$, $\Delta_1\%$ of −0.345%, $r_1$ of 5.14 $\mu m$, $\Delta_2\%$ of zero, $r_2$ of 6.45 µm, $\Delta_3\%$ of 0.243%, $r_c$ of 7.98 µm, $w_3$ of 2.09 µm, and $r_3$ of 9.81 µm.

EXAMPLE 9

Optical waveguide fibers having respective refractive index profiles in accord with FIG. 14 were manufactured using as target parameter values:

- central segment $\Delta_o\%$ of 1.18% and outer radius $r_o$ 2.53 µm;
- first annular segment $\Delta_1\%$ of −0.45% and outer radius $r_1$ 5.8 µm;
- second annular segment $\Delta_2\%$ of 0.15% and outer radius 7.52 µm; and,
- third annular segment of center radius $r_c$ of 8.0 µm, width $w_3$ of 1.0 µm, and outer radius 8.53 µm.

Figure 15:
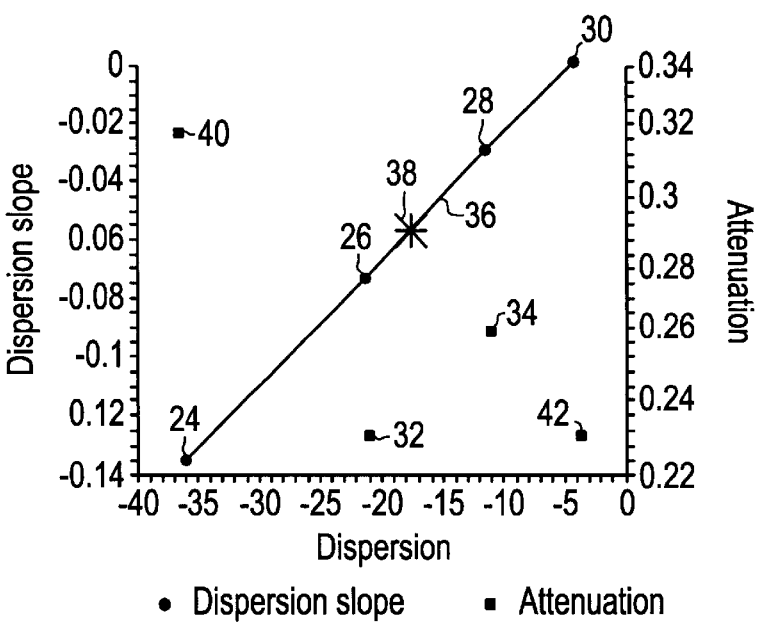
FIG. 15 is a chart of total dispersion slope versus total dispersion for embodiments of the invention exemplified by FIG. 14.

Four fibers were drawn from the same preform. The measured total dispersion and dispersion slope for these fibers are shown as points 24, 26, 28, and 30 which define the straight line 36 in FIG. 15. The values of total dispersion and total dispersion slope were varied by changing the outside diameter of the optical waveguide fiber in the drawing step.

The linear dependence of the total dispersion on dispersion slope predicts point 38 which has a total dispersion of −17 ps/nm-km and total dispersion slope of 0.06 ps/nm²-km at a nominal diameter of 125 µm, an industry standard for outside diameter. The attenuation is not expected to depend linearly upon waveguide fiber outside diameter. However, this manufacturing example demonstrates that low attenuation is possible using the refractive index profile in accord with the invention. Of the four fibers, only the smallest diameter fiber, corresponding to attenuation point 40 had an attenuation above 0.26 dB/km. Attenuation points 32, 34, and 42, for larger outside diameters are at 0.23 dB/km, 0.26 dB/km, and 0.23 dB/km, respectively. These data show that at the target values of total dispersion and total dispersion slope a high yield of optical waveguide fiber having attenuation less than or equal to 0.25 dB/km is to be expected.

It will be apparent to those skilled in the art that various modifications and variations of the present invention can be made without departing from the spirit and scope of the invention. Thus, it is intended that the present invention include the modifications and variations of this invention provided they come within the scope of the appended claims and their equivalents.

We claim:

1. A dispersion compensating optical waveguide fiber comprising:
   a core region surrounded by and in contact with a clad layer, the core region and the clad layer having respective refractive index profiles; wherein,
   the respective refractive index profiles are selected to provide an optical waveguide fiber having, at a wavelength of 1550 nm, a total dispersion in a range from −12 ps/nm-km to −35 ps/nm-km, a total dispersion slope in a range from −0.04 ps/nm²-km to −0.11 ps/nm²-km, and attenuation at 1550 nm of less than or equal to 0.25 dB/km.

2. The dispersion compensating optical waveguide fiber of claim 1 wherein the respective refractive index profiles are selected to result in a polarization mode dispersion less than 0.10 ps/km$^{1/2}$.

3. The dispersion compensating optical waveguide fiber of claim 1 wherein the respective refractive index profiles are selected to result in a polarization mode dispersion less than 0.01 ps/km$^{1/2}$.

4. The dispersion compensating optical waveguide fiber of claim 1 wherein the respective refractive index profiles are selected to result in a ratio of total dispersion to total dispersion slope in the range from 225 nm to 375 nm.

5. The dispersion compensating optical waveguide fiber of claim 1 wherein attenuation at 1550 nm is less than or equal to 0.22 dB/km.

6. The dispersion compensating optical waveguide fiber of claim 1 wherein said core region comprises:
   a central segment having a relative refractive index percent, $\Delta_o\%$, in the range from 0.8% to 1.7%, an inner radius zero and an outer radius, $r_o$, in the range from 2.2 µm to 3.2 µm;
   a first annular segment, surrounding the central segment, having a relative refractive index percent, $\Delta_1\%$, in the range from −0.28% to −0.45%, an inner radius $r_o$ and an outer radius, $r_1$, in the range from 5.0 µm to 6.7 µm; and,
   a second annular segment, surrounding the first annular segment, having a relative refractive index percent, $\Delta_3\%$, in the range from 0.235% to 0.55%, an outer radius, $r_3$, in the range from 7.5 µm to 11.0 µm, center radius, $r_c$, in the range from 7.0 µm to 9.6 µm, and width, $w_3$, in the range from 0.8 µm to 3.0 µm.

7. The dispersion compensating optical waveguide fiber of claim 6 further comprising a third annular segment, surrounding the first annular segment, having a relative refractive index percent, $\Delta_2\%$, in the range from zero to 0.15%, an inner radius $r_1$ and an outer radius, $r_2$, in the range from 5.9 µm to 8.0 µm.

8. The dispersion compensating optical waveguide fiber of claim 6 wherein said central segment is an α-profile and α has a range from 0.8 to 3.5.

9. The dispersion compensating optical waveguide fiber of claim 1 wherein total dispersion has a range from −12 ps/nm-km to −22 ps/nm-km, total dispersion slope has a range from −0.04 ps/nm²-km to −0.08 ps/nm²-km, effective area is greater than 25 µm², and pin array bend loss is less than 7 dB.

10. The dispersion compensating optical waveguide fiber of claim 8 wherein the ratio of total dispersion to total dispersion slope is in the range from 250 nm to 350 nm.

11. The dispersion compensating optical waveguide fiber of claim 8 wherein said core region comprises:
   a central segment having a relative refractive index percent, $\Delta_o\%$, in the range from 0.80% to 1.20%, an inner radius zero and an outer radius, $r_o$, in the range from 2.2 µm to 3.2 µm;
   a first annular segment, surrounding the central segment, having a relative refractive index percent, $\Delta_1\%$, in the range from −0.30% to −0.44%, an inner radius $r_o$ and an outer radius, $r_1$, in the range from 5.25 µm to 6.4 µm; and,
   a second annular segment, surrounding the first annular segment, having a relative refractive index percent, $\Delta_3\%$, in the range from 0.27% to 0.5%, an outer radius, $r_3$, in the range from 7.7 µm to 11.0 µm, center radius, $r_c$, in the range from 7.0 µm to 9.6 µm, and width, $w_3$, in the range from 0.9 µm to 3.0 µm.

12. The dispersion compensating optical waveguide fiber of claim 11 further comprising a third annular segment, surrounding the first annular segment, having a relative refractive index percent, $\Delta_2\%$, in the range from zero to 0.15%, an inner radius $r_1$ and an outer radius, $r_2$, in the range from 6.0 µm to 7.9 µm.

13. The dispersion compensating optical waveguide fiber of claim 11 wherein said central segment is an α-profile and α has a range from 1.0 to 2.2, and $\Delta_o\%$ has a range from 1.0% to 1.2%.

14. The dispersion compensating optical waveguide fiber of claim 11 wherein said central segment is an α-profile and α has a range from 2.2 to 3.5, $\Delta_o\%$ in the range from 0.8% to 1.0%, and effective area greater than 30 $\mu m^2$.

15. The dispersion compensating optical waveguide fiber of claim 1 wherein total dispersion has a range from −24 ps/nm-km to −35 ps/nm-km, total dispersion slope has a range from −0.08 ps/nm²-km to −0.11 ps/nm²-km effective area is greater than 25 $\mu m^2$, and pin array bend loss is less than 7 dB.

16. The dispersion compensating optical waveguide fiber of claim 15 wherein the ratio of total dispersion to total dispersion slope is in the range from 275 nm to 375 nm.

17. The dispersion compensating optical waveguide fiber of claim 15 wherein said core region comprises:

a central segment having relative index percent in the range from 1.4% to 1.7%, an inner radius zero outer radius, $r_o$, in the range from 2.6 $\mu m$ to 3.0 $\mu m$;

a first annular segment, surrounding the central segment, having relative index percent in the range from −0.28% to −0.36%, inner radius $r_o$ and outer radius, $r_1$, in the range from 5.1 $\mu m$ to 6.0 $\mu m$; and, a second annular segment, surrounding the first annular segment, having relative index percent in the range from 0.235% to 0.4%, a center radius in the range from 7.5 $\mu m$ to 8.5 $\mu m$, outer radius in the range from 8.5 $\mu m$ to 9.5 $\mu m$, and width, $w_3$, in the range from 1.5 $\mu m$ to 2.5 $\mu m$.

18. The dispersion compensating optical waveguide fiber of claim 17 further comprising a third annular segment, surrounding the first annular segment, having relative index percent in the range from zero to 0.05%, inner radius $r_1$, and outer radius, $r_2$, in the range from 6.3 $\mu m$ to 7.7 $\mu m$.

19. The dispersion compensating optical waveguide fiber of claim 17 wherein said central segment is an α-profile and α has a range from 0.8 to 1.2.

20. A dispersion compensating optical waveguide fiber comprising:

a core region surrounded by and in contact with a clad layer, wherein the core region and the clad layer have respective refractive index profiles; wherein, said core region includes a central segment having a relative index percent $\Delta_1\%$ and a first annular segment surrounding the central segment and having a relative index percent $\Delta_1\%$, each said segment having an inner and an outer radius, and a refractive index profile, the respective radii, refractive index profiles, and relative index percents selected to provide an optical waveguide fiber having, at a wavelength of 1550 nm, a total dispersion in a range from −12 ps/nm-km to −35 ps/nm-km, a total dispersion slope in a range from −0.04 ps/nm²-km to −0.11 ps/nm²-km; and, wherein, $\Delta_1\% > \Delta_2\%$, $\Delta_2\% < \Delta_c\%$, where $\Delta_c\%$ is the relative index percent of the clad layer, and the ratio of the outer radius of the central segment, $r_o$, to the outer radius, $r_1$, of the first annular segment is defined by $0.4 < r_o/r_1 \leq 0.6$.

21. The dispersion compensating optical waveguide fiber of claim 20 wherein the ratio of total dispersion to total dispersion slope is in the range 225 nm to 375 nm.

22. The dispersion compensating optical waveguide fiber of claim 20 wherein said central segment comprises, a relative refractive index percent, $\Delta_o\%$, in the range from 0.8% to 1.7%, an outer radius, $r_o$, in the range from 2.2 $\mu m$ to 3.2 $\mu m$; and, said first annular segment, surrounding the central segment, comprises a relative refractive index percent, $\Delta_1\%$, in the range from −0.28% to −0.45%, an inner radius $r_o$ and an outer radius, $r_1$, in the range from 5.0 $\mu m$ to 6.7 $\mu m$.

23. The dispersion compensating optical waveguide fiber of claim 22 further comprising:

a second annular segment, surrounding the first annular segment, having a relative refractive index percent, $\Delta_2\%$, in the range from zero to 0.15%, an inner radius $r_1$ and an outer radius, $r_2$, in the range from 5.9 $\mu m$ to 8.0 $\mu m$.

24. The dispersion compensating optical waveguide fiber of claim 23 further comprising:

a third annular segment surrounding said second annular segment a relative refractive index percent, $\Delta_3\%$, in the range from 0.235% to 0.55%, an inner radius $r_2$, an outer radius, $r_3$, in the range from 7.5 $\mu m$ to 11.0 $\mu m$, center radius, $r_c$, in the range from 7.0 $\mu m$ to 9.6 $\mu m$, and width, $w_3$, in the range from 0.8 $\mu m$ to 3.0 $\mu m$.

25. The dispersion compensating optical waveguide fiber of claim 22 wherein said central segment is an α-profile and α has a range from 0.8 to 3.5.

26. The dispersion compensating optical waveguide fiber of claim 20 wherein total dispersion has a range from −12 ps/nm-km to −22 ps/nm-km, total dispersion slope has a range from −0.04 ps/nm²-km to −0.08 ps/nm²-km, effective area is greater than 25 $\mu m^2$, attenuation at 1550 nm is less than 0.25 dB/km, polarization mode dispersion is less than 0.10 ps/km$^{1/2}$, and pin array bend loss is less than 7 dB.

27. The dispersion compensating optical waveguide fiber of claim 26 wherein the ratio of total dispersion to total dispersion slope is in the range from 250 nm to 350 nm.

28. The dispersion compensating optical waveguide fiber of claim 26 wherein, said core region comprises:

a central segment having a relative refractive index percent, $\Delta_o\%$, in the range from 0.80% to 1.20%, an inner radius zero and an outer radius, $r_o$, in the range from 2.2 $\mu m$ to 3.2 $\mu m$;

a first annular segment, surrounding the central segment, having a relative refractive index percent, $\Delta_1\%$, in the range from −0.3% to −0.44%, an inner radius $r_o$ and an outer radius, $r_1$, in the range from 5.25 $\mu m$ to 6.4 $\mu m$;

a second annular segment, surrounding the first annular segment, having a relative refractive index percent, $\Delta_3\%$, in the range from 0.27% to 0.5%, an outer radius, $r_3$, in the range from 7.7 $\mu m$ to 11.0 $\mu m$, center radius, $r_c$, in the range from 7.0 $\mu m$ to 9.6 $\mu m$, and width, $w_3$, in the range from 0.9 $\mu m$ to 3.0 $\mu m$.

29. The dispersion compensating optical waveguide fiber of claim 28 said core region further comprising a third annular segment, surrounding the first annular segment, having a relative refractive index percent, $\Delta_2\%$, in the range from zero to 0.15%, an inner radius $r_1$ and an outer radius, $r_2$, in the range from 6.0 $\mu m$ to 7.9 $\mu m$.

30. The dispersion compensating optical waveguide fiber of claim 28 wherein said central segment is an α-profile and α has a range from 1.0 to 2.2, and $\Delta_o\%$ has a range from 1.0% to 1.2%.

31. The dispersion compensating optical waveguide fiber of claim 28 wherein said central segment is an α-profile and α has a range from 2.2 to 3.5, $\Delta_o\%$ in the range from 0.8% to 1.0%, and effective area greater than 30 $\mu m^2$.

32. The dispersion compensating optical waveguide fiber of claim 20 wherein total dispersion has a range from −24 ps/nm-km to −35 ps/nm-km, total dispersion slope has a range from −0.08 ps/nm²-km to −0.11 ps/nm²-km effective area is greater than 25 $\mu m^2$, attenuation at 1550 nm is less than 0.25 dB/km, and pin array bend loss is less than 7 dB.

33. The dispersion compensating optical waveguide fiber of claim 32 wherein the ratio of total dispersion to total dispersion slope is in the range from 275 nm to 375 nm.

34. The dispersion compensating optical waveguide fiber of claim 32 wherein said core region comprises:
a central segment having relative index percent in the range from 1.4% to 1.7%, an inner radius zero outer radius, $r_o$, in the range from 2.6 µm to 3.0 µm;
a first annular segment, surrounding the central segment, having a relative index percent in the range from −0.28% to −0.36%, inner radius $r_o$ and outer radius, $r_1$, in the range from 5.1 µm to 6.0 µm;
a second annular segment, surrounding the first annular segment, having relative index percent in the range from zero to 0.05%, inner radius $r_1$, and outer radius, $r_2$, in the range from 6.3 µm to 7.7 µm; and,
a third annular segment, surrounding the second annular segment, having relative index percent in the range from 0.235% to 0.4%, inner radius $r_2$, a center radius in the range from 7.5 µm to 8.5 µm, outer radius in the range from 8.5 µm to 9.5 µm, and width, $w_3$, in the range from 1.5 µm to 2.5 µm.

35. The dispersion compensating optical waveguide fiber of claim 34 wherein said central segment is an α-profile and α has a range from 0.8 to 1.2.

36. A dispersion compensating optical waveguide fiber comprising:
a core region surrounded by and in contact with a clad layer, wherein the core region and the clad layer have respective refractive index profiles; wherein,
said core region includes a central segment and three annular segments surrounding the central segment, the first or innermost annular segment surrounding said central segment, the second annular segment surrounding the first annular segment, and the third annular segment surrounding the second annular segment, and, each said segment having an inner and an outer radius, a refractive index profile, and a relative index percent, the respective radii, refractive index profiles, and relative index percents selected to provide an optical waveguide fiber having, at a wavelength of 1550 nm, a total dispersion in a range from −12 ps/nm-km to −35 ps/nm-km, a total dispersion slope in a range from −0.04 ps/nm²-km to −0.11 ps/nm²-km; and, wherein,
the outer radius of the first annular segment, $r_1$, the center radius of the third annular segment is $r_c$, and the width, $w_3$, of the third annular segment, measured as the distance between the two refractive index profile points at half the relative index percent of the third annular segment, maximum are related as: $r_c - w_3/2 > r_1 + 0.5$ µm.

37. The dispersion compensating optical waveguide fiber of claim 36 wherein the ratio of total dispersion to total dispersion slope is in the range 225 nm to 375 nm.

38. The dispersion compensating optical waveguide fiber of claim 36 wherein
said central segment has a relative refractive index percent, $\Delta_o\%$, in the range from 0.8% to 1.7%, an inner radius zero and an outer radius, $r_o$, in the range from 2.2 µm to 3.2 µm;
said first annular segment has a relative refractive index percent, $\Delta_1\%$, in the range from −0.28% to −0.45%, an inner radius $r_o$ and an outer radius, $r_1$, in the range from 5.0 µm to 6.7 µm;

said second annular segment has a relative refractive index percent, $\Delta_2\%$, in the range from zero to 0.15%, an inner radius $r_1$ and an outer radius, $r_2$, in the range from 5.9 µm to 8.0 µm; and,
said third annular segment has a relative refractive index percent, $\Delta_3\%$, in the range from 0.235% to 0.55%, an inner radius $r_2$, an outer radius, $r_3$, in the range from 7.5 µm to 11.0 µm, center radius, $r_c$, in the range from 7.0 µm to 9.6 µm, and width, $w_3$, in the range from 0.8 µm to 3.0 µm.

39. The dispersion compensating optical waveguide fiber of claim 38 wherein said central segment is an α-profile and α has a range from 0.8 to 3.5.

40. The dispersion compensating optical waveguide fiber of claim 36 wherein total dispersion has a range from −12 ps/nm-km to −22 ps/nm-km, total dispersion slope has a range from −0.04 ps/nm²-km to −0.08 ps/nm²-km, effective area is greater than 25 µm², attenuation at 1550 nm is less than 0.25 dB/km and pin array bend loss is less than 7 dB.

41. The dispersion compensating optical waveguide fiber of claim 40 wherein the ratio of total dispersion to total dispersion slope is in the range from 250 nm to 350 nm.

42. The dispersion compensating optical waveguide fiber of claim 36 wherein total dispersion has a range from −24 ps/nm-km to −35 ps/nm-km, total dispersion slope has a range from −0.08 ps/nm²-km to −0.11 ps/nm²-km effective area is greater than 25 µm², attenuation at 1550 nm is less than 0.25 dB/km, and pin array bend loss is less than 7 dB.

43. The dispersion compensating optical waveguide fiber of claim 42 wherein the ratio of total dispersion to total dispersion slope is in the range from 275 nm to 375 nm.

44. A dispersion compensating optical waveguide fiber comprising:
a core region surrounded by and in contact with a clad layer, the core region and the clad layer having respective refractive index profiles; wherein,
the respective refractive index profiles are selected to provide an optical waveguide fiber having, at a wavelength of 1550 nm, a total dispersion in a range from −12 ps/nm-km to −35 ps/nm-km, a total dispersion slope in a range from −0.04 ps/nm²-km to −0.11 ps/nm²-km, and,
resistance to bend loss is characterized by: an induced attenuation of less than 0.05 dB at 1310 nm and less than 0.10 dB at 1550 nm when the fiber is wrapped 100 turns about a 50 mm diameter mandrel; an induced attenuation of less that 0.50 dB at 1550 nm when the fiber is wrapped 1 turn about a 32 mm diameter mandrel; an induced attenuation of less than 0.50 dB at 1625 nm when the fiber is wrapped 100 turns about a 75 mm mandrel; an induced attenuation of less than 1.0 dB/m under lateral load testing; and, an induced attenuation of less than 8 dB when the fiber is configured in a pin array bend test.

45. The dispersion compensating optical waveguide fiber of claim 43 wherein the ratio of total dispersion to total dispersion slope is in the range 225 nm to 375 nm.

46. The dispersion compensating optical waveguide fiber of claim 44 wherein total dispersion has a range from −12 ps/nm-km to −22 ps/nm-km, total dispersion slope has a range from −0.04 ps/nm²-km to −0.08 ps/nm²-km, effective area is greater than 25 µm², and pin array bend loss is less than 7 dB.

47. The dispersion compensating optical waveguide fiber of claim 46 wherein the ratio of total dispersion to total dispersion slope is in the range from 250 nm to 350 nm.

48. The dispersion compensating optical waveguide fiber of claim 46 wherein total dispersion has a range from −24 ps/nm-km to −35 ps/nm-km, total dispersion slope has a range from −0.08 ps/nm²-km to −0.11 ps/nm²-km effective area is greater than 25 $\mu$m², and pin array bend loss is less than 7 dB.

49. The dispersion compensating optical waveguide fiber of claim 48 wherein the ratio of total dispersion to total dispersion slope is in the range from 275 nm to 375 nm.

50. An optical waveguide fiber transmission link comprising:

an optical waveguide fiber made in accord with any one of claims, 1, 20, 36, or 44.

51. A telecommunications system comprising a fiber link consisting of at least two lengths of fiber which exhibit a positive dispersion at 1550 nm, and a length of fiber in accordance with claim 1 located between said at least two lengths of positive dispersion fiber.

* * * * *

UNITED STATES PATENT AND TRADEMARK OFFICE
CERTIFICATE OF CORRECTION

PATENT NO. : 6,671,445 B2
DATED : August 26, 2003
INVENTOR(S) : Berkey, George E et al.

It is certified that error appears in the above-identified patent and that said Letters Patent is hereby corrected as shown below:

Column 20,
Line 67, "of claim 46 wherein total dispersion has a range from -24" should be -- of claim 44 wherein total dispersion has a range from -24 --

Signed and Sealed this

Twenty-ninth Day of June, 2004

JON W. DUDAS
*Acting Director of the United States Patent and Trademark Office*